US008046800B2

(12) United States Patent
Daniels

(10) Patent No.: US 8,046,800 B2
(45) Date of Patent: Oct. 25, 2011

(54) REMOTELY CONTROLLING A VIDEO RECORDER

(75) Inventor: John J Daniels, Seymour, CT (US)

(73) Assignee: Microsoft Corporation, Redmond, WA (US)

( * ) Notice: Subject to any disclaimer, the term of this patent is extended or adjusted under 35 U.S.C. 154(b) by 644 days.

(21) Appl. No.: 09/993,780

(22) Filed: Nov. 16, 2001

(65) Prior Publication Data

US 2002/0100044 A1    Jul. 25, 2002

Related U.S. Application Data

(63) Continuation of application No. 08/900,417, filed on Jul. 25, 1997, now abandoned, which is a continuation-in-part of application No. 08/641,517, filed on May 1, 1996, now abandoned, which is a continuation-in-part of application No. 08/306,642, filed on Sep. 15, 1994, now abandoned, which is a continuation-in-part of application No. 08/038,240, filed on Mar. 29, 1993, now abandoned.

(51) Int. Cl.
*H04N 7/173* (2011.01)

(52) U.S. Cl. .......................................... 725/58; 386/299

(58) Field of Classification Search .................... 725/39, 725/40, 48, 51, 54, 59, 61, 37, 38, 58, 91, 725/93, 114, 116, 101, 110, 49; 386/1, 83, 386/299; 379/102.03; *H04N 7/173*
See application file for complete search history.

(56) References Cited

U.S. PATENT DOCUMENTS

| | | | | |
|---|---|---|---|---|
| 3,341,833 A | 9/1967 | Jones | ........................... | 340/174.1 |
| 3,645,539 A | 2/1972 | Jenkins | ........................... | 274/4 B |
| 3,682,363 A | 8/1972 | Hull | .............................. | 226/118 |
| 4,268,724 A | 5/1981 | Hubbard | ........................... | 369/7 |
| 4,553,178 A | 11/1985 | Lynch | .............................. | 360/45 |
| 4,618,895 A | 10/1986 | Wright | ........................... | 358/311 |
| 4,729,044 A | 3/1988 | Kiesel | ........................... | 360/14.3 |
| 4,768,110 A | 8/1988 | Dunlap et al. | ............... | 360/33.1 |
| 4,805,036 A | 2/1989 | Kido et al. | .................... | 358/335 |
| 4,807,204 A | 2/1989 | Mizutani et al. | ................ | 369/13 |

(Continued)

FOREIGN PATENT DOCUMENTS

EP    1146737 A1    10/2001

(Continued)

OTHER PUBLICATIONS

*Intel Intercast Technologies*, downloaded on Dec. 30, 1996 from the World Wide Web site http://www.intel.com/iaweb/intercast/index.htm.

(Continued)

*Primary Examiner* — Young Lee

(74) *Attorney, Agent, or Firm* — Workman Nydegger

(57) ABSTRACT

A client system for remotely controlling a video recorder receives program data from a remote server in response to user input selecting a time sequential signal from a program schedule guide provided by the remote server, via the Internet, email, a computer-readable medium, or a broadcast signal. The user input is transmitted to the remote server over the Internet from the client system or a remote location. The client system determines when it is time to record the time sequential signal based at least in part upon the program data, which includes broadcast time, channel, and duration. Upon determining it is time to record, the client system tunes to, receives, and records the transmission of the time sequential signal.

29 Claims, 22 Drawing Sheets

U.S. PATENT DOCUMENTS

| | | | |
|---|---|---|---|
| 4,876,670 A | 10/1989 | Nakabayashi et al. | 365/194 |
| 4,885,803 A | 12/1989 | Hermann et al. | 455/603 |
| 5,067,029 A | 11/1991 | Takahashi | 358/909 |
| 5,088,081 A | 2/1992 | Farr | 369/54 |
| 5,124,807 A | 6/1992 | Dunlap et al. | 358/316 |
| 5,130,969 A | 7/1992 | Sako | 369/58 |
| 5,134,499 A | 7/1992 | Sata et al. | 358/342 |
| 5,155,591 A | 10/1992 | Wachob | 358/86 |
| 5,177,618 A | 1/1993 | Dunlap et al. | 358/335 |
| 5,194,963 A | 3/1993 | Dunlap et al. | 358/314 |
| 5,239,420 A | 8/1993 | Choi | 360/15 |
| 5,241,428 A | 8/1993 | Goldwasser et al. | 360/7 |
| 5,257,142 A | 10/1993 | Hong | 360/33.1 |
| 5,280,392 A | 1/1994 | Koo | 360/15 |
| 5,287,547 A | 2/1994 | Hidaka | 455/4.2 |
| 5,321,846 A | 6/1994 | Yokota et al. | 455/4.2 |
| 5,327,114 A | 7/1994 | Straate et al. | 340/286.06 |
| 5,329,320 A | 7/1994 | Yifrach | 348/738 |
| 5,335,081 A | 8/1994 | Yamaguchi et al. | 358/342 |
| 5,349,477 A | 9/1994 | Shuto | 360/15 |
| 5,371,551 A | 12/1994 | Logan et al. | 348/571 |
| 5,426,534 A | 6/1995 | Nakata et al. | 360/15 |
| 5,485,219 A * | 1/1996 | Woo | 25/58 |
| 5,500,794 A | 3/1996 | Fujita et al. | 364/188 |
| 5,515,098 A | 5/1996 | Carles | 348/8 |
| 5,550,576 A * | 8/1996 | Klosterman | 725/49 |
| 5,553,123 A * | 9/1996 | Chan et al. | 379/102.03 |
| 5,555,463 A | 9/1996 | Staron | 348/560 |
| 5,585,858 A | 12/1996 | Harper et al. | 348/485 |
| 5,613,190 A | 3/1997 | Hylton | 455/3.1 |
| 5,701,383 A | 12/1997 | Russo et al. | 386/46 |
| 5,708,961 A | 1/1998 | Hylton et al. | 455/4.2 |
| 5,722,041 A | 2/1998 | Freadman | 455/6.3 |
| 5,729,281 A | 3/1998 | Utsumi et al. | 348/12 |
| 5,774,841 A | 6/1998 | Salazar et al. | 704/225 |
| 5,796,440 A | 8/1998 | Rupinski et al. | 348/476 |
| 5,808,662 A | 9/1998 | Kinney et al. | 348/15 |
| 5,815,146 A | 9/1998 | Youden et al. | 345/327 |
| 5,818,540 A | 10/1998 | Mies et al. | 348/559 |
| 5,828,403 A | 10/1998 | DeRodeff et al. | 348/7 |
| 5,873,022 A | 2/1999 | Huizer et al. | 455/4.2 |
| 5,918,020 A | 6/1999 | Blackard et al. | 395/200.58 |
| 5,936,660 A | 8/1999 | Gurantz | 348/10 |
| 5,987,509 A | 11/1999 | Portuesi | 709/217 |
| 5,990,881 A | 11/1999 | Inoue et al. | 345/327 |
| 6,014,386 A | 1/2000 | Abraham | 370/485 |
| 6,018,612 A | 1/2000 | Thomason et al. | 386/82 |
| 6,038,368 A | 3/2000 | Boetje et al. | 386/52 |
| 6,049,823 A | 4/2000 | Hwang | 709/218 |
| 6,065,050 A | 5/2000 | DeMoney | 709/219 |
| 6,067,108 A | 5/2000 | Yokote et al. | 348/7 |
| 6,108,516 A | 8/2000 | Kuether | 455/2.3 |
| 6,137,539 A | 10/2000 | Lownes et al. | 348/569 |
| 6,175,308 B1 | 1/2001 | Tallman et al. | 340/539 |
| 6,177,931 B1 | 1/2001 | Alexander | |
| 6,184,877 B1 | 2/2001 | Dodson et al. | 345/327 |
| 6,239,794 B1 | 5/2001 | Yuen et al. | 345/327 |
| 6,253,375 B1 | 6/2001 | Gordon et al. | 725/88 |
| 6,259,441 B1 | 7/2001 | Ahmad et al. | 345/173 |
| 6,259,891 B1 | 7/2001 | Allen | 455/3.02 |
| 6,272,278 B1 | 8/2001 | Takahata et al. | 386/46 |
| 6,285,746 B1 | 9/2001 | Duran et al. | 379/93.21 |
| 6,289,165 B1 | 9/2001 | Abecassis | 386/46 |
| 6,308,213 B1 | 10/2001 | Valencia | 709/227 |
| 6,349,410 B1 | 2/2002 | Lortz | 725/110 |
| 6,359,636 B1 | 3/2002 | Schindler et al. | 395/155 |
| 6,388,714 B1 * | 5/2002 | Schein et al. | 725/39 |
| 6,452,935 B1 | 9/2002 | Gibbs | 370/439 |
| 6,480,667 B1 | 11/2002 | O'Connor | 386/83 |
| 6,493,874 B2 | 12/2002 | Humpleman | 725/78 |
| 6,493,875 B1 | 12/2002 | Eames et al. | 725/81 |
| 6,496,980 B1 | 12/2002 | Tillman et al. | 725/90 |
| 6,543,053 B1 | 4/2003 | Li et al. | 725/88 |
| 6,570,974 B1 | 5/2003 | Gerszberg et al. | 379/218.01 |
| 6,603,488 B2 | 8/2003 | Humpleman et al. | 345/733 |
| 6,622,304 B1 | 9/2003 | Carhart | 725/74 |
| 6,637,030 B1 | 10/2003 | Klein | 725/78 |
| 6,721,954 B1 | 4/2004 | Nickum | |
| 6,732,158 B1 | 5/2004 | Hesselink | |
| 6,789,106 B2 | 9/2004 | Eyer | 709/205 |
| 6,832,385 B2 | 12/2004 | Young | 725/39 |
| 6,973,669 B2 | 12/2005 | Daniels | 725/112 |
| 7,281,261 B2 | 10/2007 | Jaff | |
| 2002/0032907 A1 | 3/2002 | Daniels | 725/51 |
| 2002/0048448 A1 | 4/2002 | Daniels | 386/46 |
| 2003/0117430 A1 | 6/2003 | Reynolds et al. | 345/721 |
| 2005/0028208 A1 | 2/2005 | Ellis et al. | 725/38 |
| 2005/0060755 A1 | 3/2005 | Daniels | 725/134 |
| 2005/0060756 A1 | 3/2005 | Daniels | 725/134 |
| 2005/0188409 A1 | 8/2005 | Daniels | 348/342 |
| 2006/0037044 A1 | 2/2006 | Daniels | 725/112 |
| 2007/0143783 A1 | 6/2007 | Wagner | 725/110 |

FOREIGN PATENT DOCUMENTS

| | | |
|---|---|---|
| GB | 2 252 444 A | 5/1992 |
| JP | HEI2(1990)-305288 | 12/1990 |
| JP | SHO63(1988)-20751 | 1/1998 |
| WO | WO 98/48566 | 10/1998 |
| WO | WO 98/51076 | 11/1998 |
| WO | WO 01/45407 A1 | 6/2001 |
| WO | WO 01/61997 A1 | 8/2001 |
| WO | WO 01/65862 A1 | 9/2001 |

OTHER PUBLICATIONS

*Intercast Frequently Asked Questions*, downloaded on Dec. 30, 1996 from the World Wide Web site http://www.intercast.org/onfo/info08.htm.

U.S. Appl. No. 11/682,225, filed Mar. 5, 2007, Wagner.
U.S. Appl. No. 08/038,240, filed Mar. 29, 1993, John J. Daniels.
U.S. Appl. No. 08/306,642, filed Sep. 15, 1994, John J. Daniels.
U.S. Appl. No. 07/579,555, filed Sep. 10, 1990, Patrick Young.
U.S. Appl. No. 08/641,517, filed May 1, 1996, John J. Daniels.
U.S. Appl. No. 08/848,895, filed May 1, 1997, John J. Daniels.
U.S. Appl. No. 08/900,417, filed Jul. 25, 1997, John J. Daniels.
U.S. Appl. No. 09/477,629, filed Jan. 4, 2000, John J. Daniels.
U.S. Appl. No. 60/114,668, filed Jan. 4, 1999, John J. Daniels.
U.S. Appl. No. 60/014,959, filed Apr. 8, 1996, John J. Daniels.
U.S. Appl. No. 60/107,588, filed Nov. 9, 1998, John J. Daniels.
U.S. Appl. No. 60/101,416, filed Sep. 22, 1998, John J. Daniels.
Notice of Allowance dated Apr. 2, 2008 related U.S. Appl. No. 11/250,807.
DeYonker, Aaron; Remote DVR Functional Spec, Mercury 101, Section 13, Mar. 11, 2001, 5 pgs.
Office Action dated Apr. 24, 2003 related Patent No. 7,107,608.
Notice of Allowance date Jun. 26, 2006 related Patent No. 7,107,608.
Notice of Allowance dated Jan. 31, 2007 related Patent No. 7,207,056.

\* cited by examiner

Time to record program?

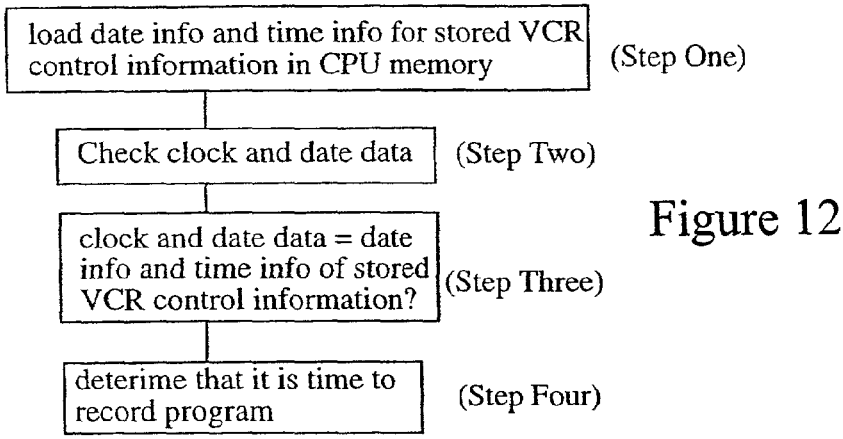

Figure 12

Retrieve stored VCR control information

Figure 13

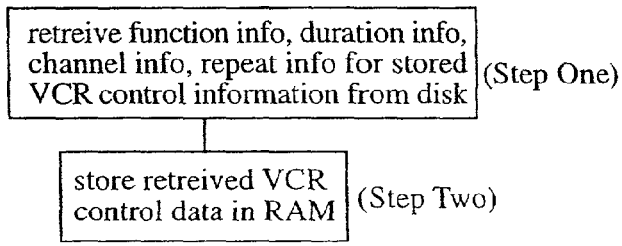

Generate Universal Remote control signals effective to control VCR to record program

(Step One) generate remote control signals as necessary to tune received television signal to channel and to control VCR to begin recording selected program (Step Two) record received television signal from selected channel for a time depending on duration info

Figure 14

Receive program selection

Send VCR control information

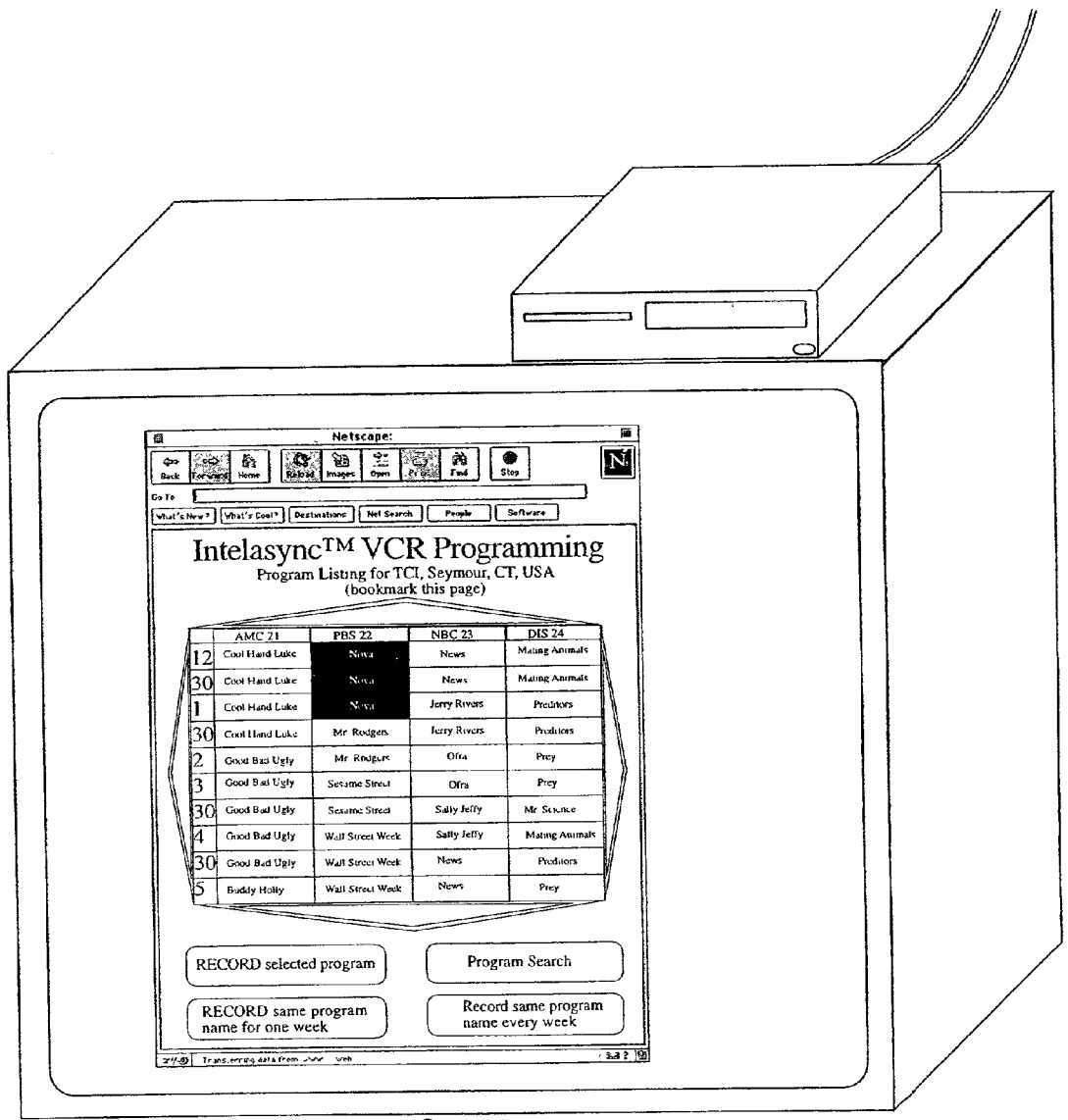
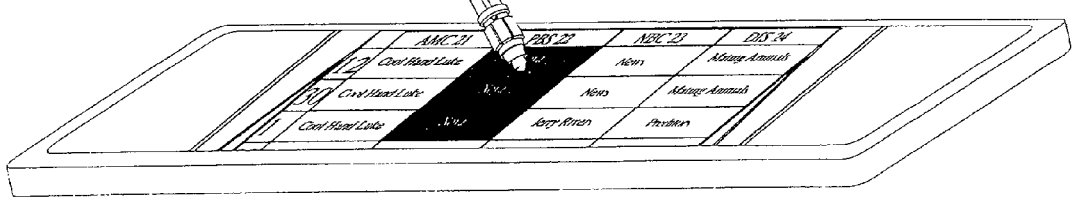
Figure 25

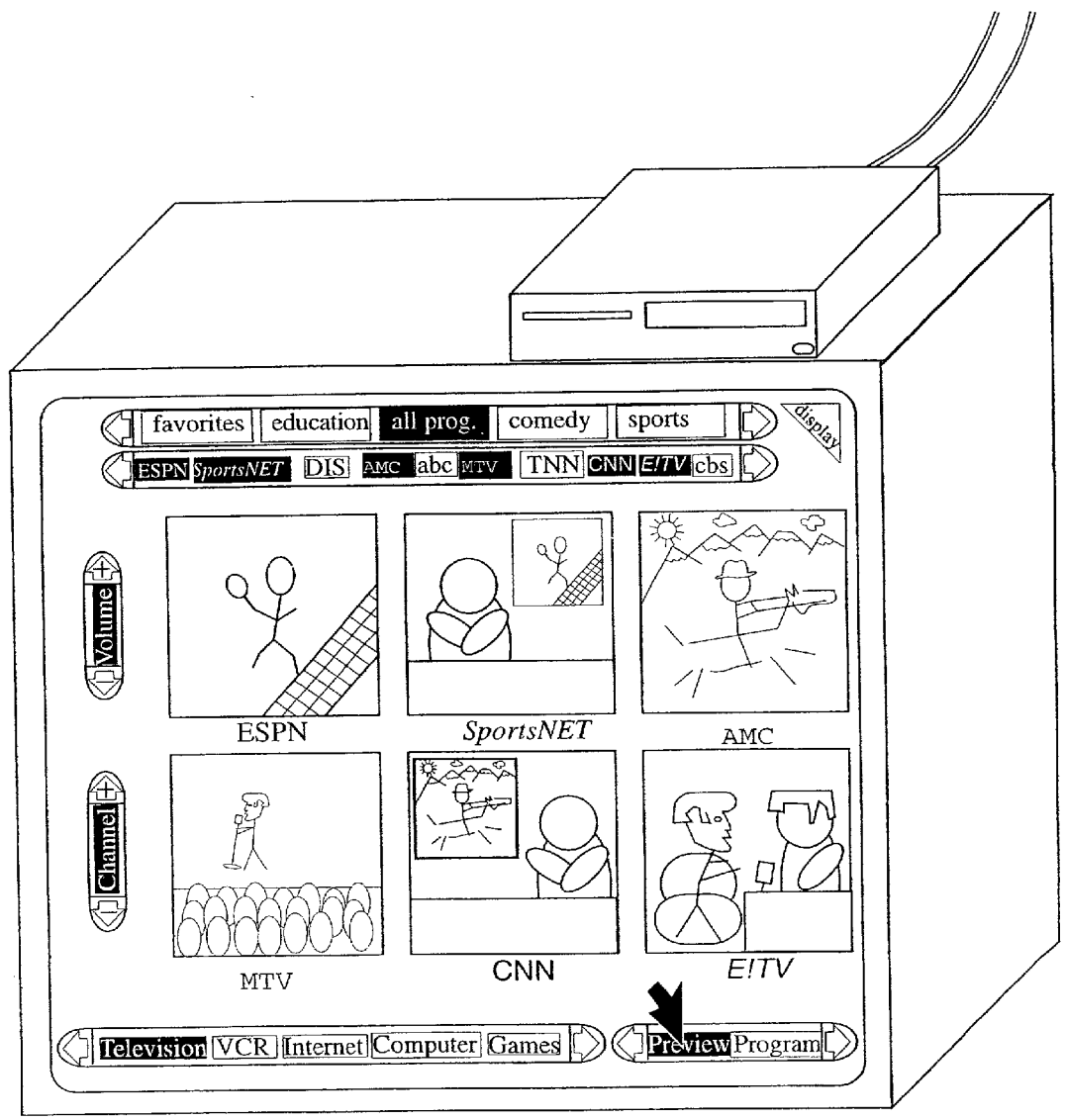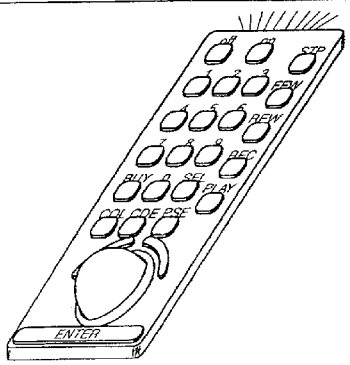
Figure 26

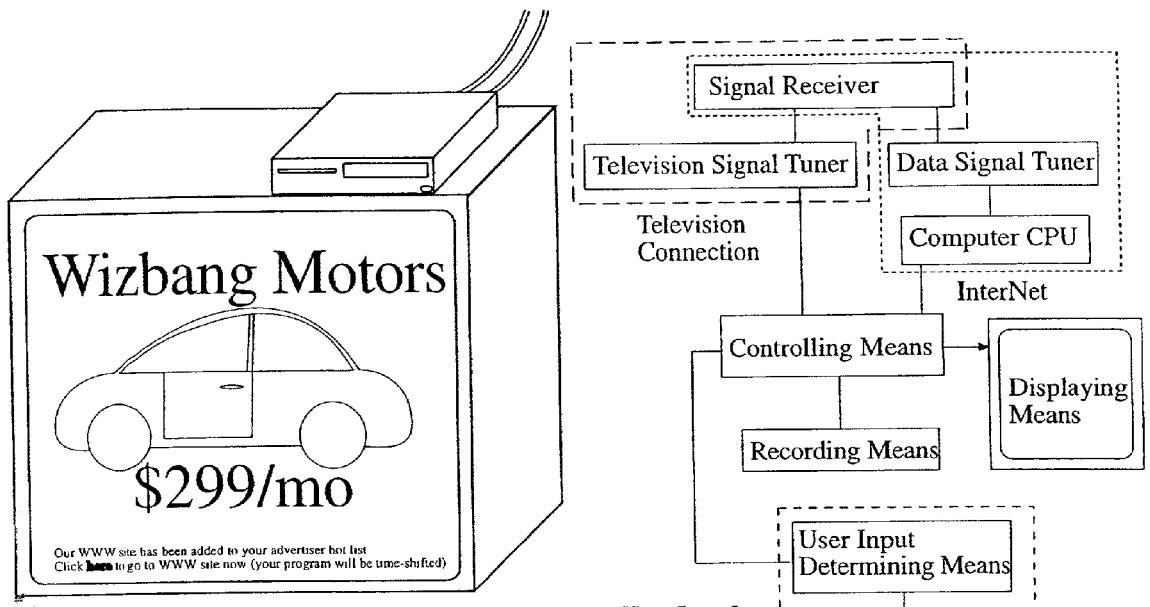
Figure 33
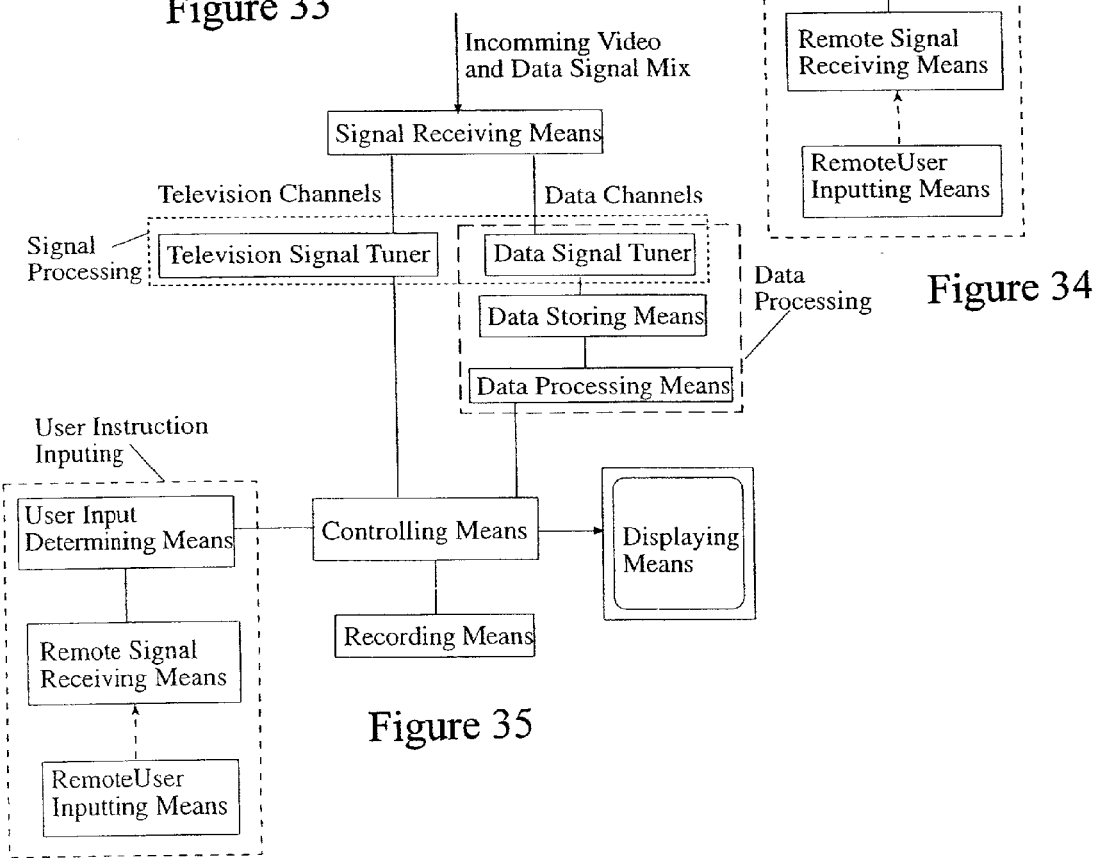
Figure 34
Figure 35

|  | Channel 1 | Channel 2 | Channel 3 | Channel 4 | Channel 5 |
|---|---|---|---|---|---|
| 12:00 pm | Guligan's Island A1 | News A2 | Rick VanDam A3 | I Like Ethel A4 | News A5 |
| 12:30 pm | Hogie's Heros B1 | I dream of Jenny B2 | Ofra B3 | Movie: Chocran B4 | General Hope B5 |
| 1:00 pm | Sally C1 | I Like Ethel C2 | News C3 | Movie: Chocran C4 | Sally C5 |
| 1:30 pm | Gerry Rivers D1 | Guligan's Island D2 | Hogie's Heros D3 | Movie: Chocran D4 | Guligan's Island D5 |
| 2:00 pm | Ofra E1 | Phil E2 | Sally E3 | Gerry Rivers E4 | Mary Taylorless E5 |
| 2:30 pm | Movie: Cats F1 | Movie: Moses F2 | Mary Taylorless F3 | News F4 | Hogie's Heros F5 |
| 3:00 pm | Movie: Cats G1 | Movie: Moses G2 | Guligan's Island G3 | Ofra G4 | Phil G5 |
| 3:30 pm | Movie: Cats H1 | Movie: Moses H2 | Gerry Rivers H3 | I dream of Jenny H4 | General Hope H5 |

Figure 42

REMOTELY CONTROLLING A VIDEO RECORDER

CROSS-REFERENCE TO RELATED APPLICATIONS

This application is a continuation of U.S. patent application Ser. No. 08/900,417, filed Jul. 25, 1997 now abandoned, which is a continuation-in-part of U.S. patent application Ser. No. 08/641,517, filed May 1, 1996 now abandoned, which is a continuation-in-part of U.S. patent application Ser. No. 08/306,642, filed Sep. 15, 1994 now abandoned which is a continuation-in-part of U.S. patent application Ser. No. 08/038,240, filed Mar. 29, 1993 now abandoned. The foregoing patent applications are incorporated herein by reference.

BACKGROUND OF THE INVENTION

Ever since events have been transmitted to and received by devices, such as radios and televisions, people have desired to be able to pause the display of a continuous event at selectable periods. Consider the example of a program being watched on a television and a viewer leaves the room to attend to a phone call. In this case, the display of the program would preferably be interrupted so that the viewer does not miss any of it. Upon returning, it is desirable to be able to resume viewing or listening to the transmitted event from the point at which the viewer left the room.

Also, when watching television, very often the viewer would like to return to a previous period in the continuously transmitted event to review that interval again. This is conventionally possible using a recording, such as a video tape of the event. In this case, the user is able to pause the video tape at any desired time. Then, at any future time the viewer can begin playing the tape again and watch the recorded event starting from the point of time on the tape at which its play back was stopped. Or, if something of interest occurs during the viewing of the recorded event, the viewer can rewind the video tape and watch that interval over and over again. After watching this interesting interval, the viewer can allow the tape to continually play to watch the rest of the event.

However in the case of a transmitted program, such as a movie received by the viewer's television, there is no way in the conventional art to temporarily pause the viewing of the transmitted program at any desired time and then later return to the transmitted program picking up at that point in time when the pause began.

For example, a viewer watching a show may be interrupted by a phone call. Traditionally, the viewer must either ignore the call and continue watching the program, or take the call and miss that interval of the program which coincides with the duration of the phone call. When the viewer returns from the phone call the program has proceeded to a different point in time and the viewer is not able to watch the interval of the program which coincides with the time of the phone call.

Also, there may be two programs being received by the viewer's television of interest to the viewer. In this case, a viewer with a video cassette recorder (VCR) may record one of the shows while viewing the other The viewer can then watch one of the shows as it is being transmitted and at a later time watch the recorded show. However, there is no conventional way for a viewer to temporarily pause from the viewing of one show and switch to the other show to watch an interesting portion thereof then switch back to the first show and resume viewing from the point at the beginning of the pause. Rather, the viewer returns to the first show at a point in time of the first show further along than the point in time of the beginning of the pause. Therefore, the viewer misses that portion of the first show which elapsed during the switch to the other program. A conventional television set allows a viewer to decide what to watch, but not when to watch it. Each television program is broadcasted from a television station, beamed from a satellite or carried over a cable, to each television set in a synchronous manner. Stated otherwise, each television set that is tuned to a particular channel receives the same television program starting and ending at the same times. Those who wish to view a program must synchronize their schedules with the time of the program broadcast. Video tape recorders have become very popular devices because they let a viewer watch a program asynchronously, but only after the program has been aired. That is, a viewer can watch the recorded program at any time he or she desires. A VCR can be programmed to record a certain show on a certain channel at a certain time. A viewer can then view the show at a later time by playing the recorded VCR tape. However, a viewer still must wait until the entire program has been received and recorded before viewing the play back from the VCR tape.

A VCR tape records a video signal in a linear sequential manner that is not randomly addressable. If the portion of the recorded program that is to be replayed is at the end of the tape, the tape must be "fast forwarded" all the way through until the beginning of the desired portion is reached. To play back a particular portion of a recorded program, the VCR tape must be either rewound or fast forwarded to the segment of tape that contains the recorded portion. However, recently recording/play back devices and disk recording media have been developed that allow a video signal to be recorded and played back in a random access manner. To replay a particular portion of a recorded event, the play back head of the recording device can quickly access the location of the disk that contains the information. Thus searching for and retrieving of a particular recorded portion can be much quicker from a disk recording medium as opposed to a tape recording medium. Further, typically the information recorded on a disk is indexed by storing distinguishing information in a file allocation table located on the disk. When a particular set of information is to be retrieved, its location on the disk is found by referencing the file allocation table.

A video signal contains a large amount of information, and thus requires a recording scheme with a large storage capacity to record, for example, a television program in its entirety (as can be done using a conventional VCR). Recently developed video compression technology and recording media now enable a useful amount of video information to be recorded in a random access manner. This recent technology includes MPEG compression, recordable compact disks, magneto-optical disks, phase change optical disks, and the like. Companies such as Sony, Hitachi and 3M are increasing the storage capacity of magneto-optical disks, and Matsushita is making advances in phase change storage technology.

The accepted wisdom in the art is that a video cassette recorder can be used to make a recording of a television show so that the show can be later watched by a viewer in an asynchronous manner, that is, with pauses and replays determined according to the desires of the viewer.

In accordance with the teachings of the prior art, a dual deck recorder can be used to make copies of prerecorded tapes, or possibly record two different shows at once (if two channels can be tuned in), or possibly watch one prerecorded show while taping another.

There is no prior reference that enables a television program to be viewed at a pace dictated by the viewer, even through the television program continues to be aired. No prior device allows a viewer to watch a broadcast television program during the broadcast as if it were a prerecorded tape (with the one exception of fast forwarding through portions of the program that have not yet been received).

The Internet has recently exploded in popularity. Computer users are getting on-line to search for and download their choice of information from the large amount of information content already available. Businesses have realized the commercial prospects of having an on-line presence, and often provide their world wide web site address in print, radio and television advertisements. A computer user with a modem can get on-line and access the business' web site to obtain more information about a particular product that the user is interested in. This form of advertisement will most likely become more and more common as internet use increases. However, the user must memorize or write down the advertiser's web site address, or perform a sometimes labor and time intensive on-line search to find the web site. If a television viewer wishes to access the advertiser's web site for more information, then he or she must wait until after the program has aired if it is desired to watch the whole program. Therefore, there is a need for a time shifting event recorder that allows a viewer to temporarily pause a program, access a computer network such as the Internet, and then resume viewing the program without missing any of it.

The Intel Corporation and others are developing a technology called intercasting, in which world wide web-like pages are distributed to television sets via the vertical blanking interval (VBI). An intercast technology group has been formed by a number of leading companies in the information technology industry. Many cable and broadcast television transmissions are incorporating the intercast or intercast-like technology and including web page-like information along with the television program.

The intercast information is currently either displayed in a split screen, or the display is toggled between the television program and the intercast information. In any event, to make use of the intercast signal the viewer must either miss part of the television program, or try to pay attention to the program while simultaneously concentrating on retrieving and understanding the intercast information. This is one of the major drawbacks of the intercast technology.

On yet another front, it has become cliché that most VCR users have much difficulty in programming their VCRs to record television programs. Even with on-screen programming, and other attempts to demystify the process, most people simply cannot program their VCRs.

On yet another front, there is a need for a device that enables users to enjoy the benefits of the on-line experience via their television. Products are being made available that enable a user to connect with the Internet through a cable or telephone modem and display, for example, world wide web pages on their television. However, these products, such as WebTV from Philips Magnavox and Sony, merely allow the user access to the Internet. They provide no means for pausing the display of a television program according to the user's desires. They also fail to offer the advantages of any of the inventions as will be discussed below.

BRIEF SUMMARY OF THE INVENTION

The invention described herein is intended to overcome the drawbacks of the conventional art. In accordance with the present invention(s) a time shifting event recorder is provided capable of recording portions of a time sequential signal representing an event so that a representation of the event can be produced in a time shifted manner.

The present invention(s) described herein enables a viewer to arbitrarily pause a television program, access a computer network such as Internet, explore the content available at the viewer's leisure and then resume viewing the program at any time without missing any of it.

In accordance with the present invention(s), the viewer has control over how a movie or television show is viewed in a manner that is not conventionally possible. If a particularly interesting or complex scene occurs, the viewer can replay it, and then return to the movie without missing any of it. If the phone rings, the viewer can pause the display of the television show, and then return to uninterrupted viewing of it at any future time, even while the rest of the show is being received, and not miss anything.

Further, the present invention(s) utilizes the vertical blanking interval (VBI) of a television program to carry Internet sites, Internet addresses or other related information that is relevant to the television program (or television commercial). The VBI is a portion of the television signal that does not contain program information, it is typically used for services such as closed-captioning. As described in detail herein, all or a portion of the related VBI-embedded information may also be "front loaded" and placed at the beginning of the time sequential signal. Once received, this information can be stored on a conventional data storage device, such as a hard drive, RAM, or the like, so that it is retrievable by a viewer at any time. Since individuals will be receiving a bulk of the relevant data en masse, widespread use of the inventions may reduce the demand on the Internet for modem connection bandwidth.

An example use of the present invention(s) would allow an advertiser to include a pathway to its information pages contained in the VBI information, world wide web page or Internet Site along with a television commercial. A viewer that wishes to learn more about an advertised product, such as an automobile, merely has to click his remote control to get the advertiser's information pages displayed. The instant the information page is available for viewing, the display of the program is paused, and time shifting recording of the program begins. This use could open the door to more targeted marketing opportunities for advertisers who today use the television to appeal to a mass audience. The invention(s) described herein can be utilized to allow such television advertisers to appeal to a more target market.

After perusing the advertiser's Internet site or information pages, the viewer can return to the television program and it is automatically replayed from the point of departure. The unique recording capabilities enabled by the inventions ensures that the viewer does not miss any of the program, no matter when or how long the Internet session takes. In accordance with the use of the present invention(s), the information available about a product does not end with the commercial. Rather, a television commercial can be linked to content where much more information can be found by a consumer with interest in the product.

The inventions described herein allows Internet network content to mix with the cable or broadcast TV medias. The inventions described herein can be used to provide viewers of a television program a pathway to a related Internet site, and a pathway from the Internet site to other television programs. For example, a viewer who enjoys a particular movie can access an Internet site that provides a hyper-link to other sites, web pages, newsgroups, or FTP addresses about other movies or programs available in the same genre.

Also, the Internet site can be used to locate future programs that the viewer wishes to watch. In this case, an Internet site can be set up that includes the programming information for each cable or satellite television system. The choice of the correct programming information is made available to each Internet subscriber by determining the locality of the user's modem connection (based on, for example, caller ID, area code and/or phone number). The Internet subscriber can also manually choose which cable or satellite system programming schedule to view. The inventions described herein can be incorporated into a cable television set top box that is programmable, via a download of information included in the television signal, the Internet, intercast or intranet site, to remind the viewer just before a selected program airs. The inventions described herein can be incorporated in a set top box capable of controlling an existing VCR to record the programs selected from a programming grid shown at, for example, an Internet web site or delivered to the user via the television signal. This feature is very exciting because it will allow VCR owners to finally easily program their VCRs to tape selected shows simply using a point and a click.

In accordance with the present inventions, the selected recording of television programs is made simple. A television program schedule is received by the user, either via a network connection or through the television signal. The user can search for and select programs that are to be recorded from an on-screen programming grid (or other information display format). Upon selecting the programs to record, control signals are downloaded to the user's apparatus (computer, digital television, Internet appliance, etc.). The control signals are used to generate remote control signals or directly control VCR or other video recording so that program recording occurs as desired.

As another example use of the present invention(s) set top box, a sporting event can be viewed with instant-replays that are controlled by the viewer and additional information embedded in the VBI, such as the scores of other games or player stats, accessed at any time. Hyper-links to Internet sport pages or chat rooms can be included and the information displayed in a split screen along with the game, or the viewing of the game can be paused at the viewer's discretion for any length of time. Even with these arbitrary pauses the present invention(s) permits the viewer to watch the entire game, no matter when and how many viewing pauses are taken.

The present inventions described herein can be provided in desktop computers used by schools to provide inexpensive individualized computer-aided instruction. Each student can pause the display of a multicasted videotaped lesson at any time, and access additional related information available from the computer memory, Internet, intercast or intranet to enable self-paced learning.

This method can also be used for "in-home" learning, to allow children, as well as adults, to continue their education in a self-paced manner. A piano lesson, for example, can incorporate a video included in a television broadcast; web-like pages embedded in the VBI; and an Internet site accessible by hyper-links that are also embedded in VBI. The video shows a piano instructor, the web-like pages include text and sheet music specific to the piano lesson, and the Internet site contains more text, video clips and sheet music, as well as links to related Internet sites With the present inventions and an Internet connection, the home-student can sit at the piano, view the video-taped instructor, and control the pace of this learning session with a remote controller. The display of the video can be paused, the web-like pages embedded in the VBI can be displayed, text read, and sheet music printed at any time appropriate for that particular student. If more information is needed, a hyper-link embedded in the VBI can be clicked to bring up a related Internet site. Once on Internet, the student will be free to search for and retrieve content related to piano lessons; piano construction; local piano classes; flute classes; and, if the student's interest should wander, fly-fishing or basket weaving. The student can later return to earlier Internet pages or the stored web-like pages, select from another stored hyper-link, or return to viewing the video at any time, including while the video is still being aired or a week thereafter. This power-learning scheme is only made possible using the present invention(s).

In accordance with the present invention(s), a viewer can suspend at will the viewing of a broadcast television program. The program is time shifted depending on the user's preferences paving the way, for example, for television/Internet options not obtainable from currently available technology.

In accordance with the present inventions, a time shifting event recorder is provided including receiving means for receiving a time sequential signal representing an event. Recording means records in a first recording medium at least one selected portion of the time sequential signal and recording means records in a second recording medium at least one other selected portion of the time sequential signal different from the at least one selected portion first recorded by the recording means. Playing-back means retrieves at selectable intervals the respective selected portions of the time sequential signal recorded in the first and second recording media and generates a play back signal dependent thereon. Controlling means controls the first and the second recording means to record the respective selected portions of the time sequential signal. The controlling means also controls the playing-back means to retrieve at the selectable intervals the respective selected portions of the time sequential signal and generate the play back signal, so that a representation of the event can be produced in a time shifted manner.

The time sequential signal can either be a video, audio, or other information carrying signal. The recording media can be a magnetic tape, a magnetic disk, an electronic memory circuit, an optically recordable disk, or any other suitable recording medium. In accordance with one embodiment of the present invention(s), each recording medium is part of a same recording medium, such as a same recordable disk. Remote control inputting means may be provided for inputting user selectable control signals to the control ling means so as to control the production of the representation of the event in a user definable time shifted manner. The time sequential signal can be stored as digital data, analog data, and the like.

In accordance with another embodiment of the present invention(s), the recording means is provided for recording in a third recording medium gap portions of the time sequential signal different from the portions recorded by the first and second recording media. The gap portions are recorded or played backed at times when either of the first or the second recording means is not able to record and/or playback the time sequential signal (such as during a rewind or play back period). The playing-back means is capable of retrieving at a gap interval each gap portion of the time sequential signal recorded in the third recording medium. The controlling means controls the recording means to record each gap portion of the time sequential signal. The controlling means also controls the playing-back means to generate the play back signal so that a representation of the event can be produced in a time shifted manner, without a break caused by a time when either of the first or the second recording means is not able to record the time sequential signal.

In accordance with still another embodiment of the present invention(s), one of the recording means consists of an already existing recording apparatus such as a VCR. In this embodiment, the controlling means is adapted to control both a recording means and the recording apparatus so that a representation of the event can be produced in a time shifted manner. The controlling means may control the recording apparatus (VCR) via remote control signals by accessing the VCR's remote control capabilities.

In yet another embodiment of the present invention(s), supplying means is provided for supplying a play back signal of a previously recorded portion of the time sequential signal and a current portion of the time sequential signal to a display device simultaneously so that a time shifted representation of the event can be displayed simultaneously with a current representation of the event on the display device. In this embodiment, the viewer is thus able to return to a portion of the event being viewed and watch that portion again while simultaneously viewing the event in real time, providing user-determined instant replays of previously displayed portions of the television program. In fact, the present inventions can be configured so that the viewer may view other portions of the event, recorded on the second, third, etc. recording media, simultaneously with the portion recorded on the first recording medium and/or the current reproduction of the event.

The inventive apparatus can be used for displaying a received television program while simultaneously displaying a time shifted (paused) program in a picture-in-a-picture window. In accordance with this aspect of the invention, a cable television set top box incorporates the inventive recording apparatus. A time sequential signal (cable television signal) is received via a cable television line. The cable television line carries a number of different channels, each channel carrying a different program. Usually, a viewer selects which channel is tuned into using a remote control. In accordance with the present invention(s), the viewer can pause the display of a first program, and switch to another channel to view a different program. The paused program is recorded in the manner described herein so that the viewer can resume viewing the program at any time, without missing any of it. Further, a modification of the recording scheme discussed above can be utilized to enable simultaneous pausing of two or more programs or switching between two or more programs without missing any portion of either. For example, a viewer can start watching a program 1, and then decide to start watching a program 2. When program 1 is paused, the recording means begins recording a first recorded portion 1 of program 1. While the first recording portion 1 is being recorded, the viewer changes the television channel to start watching program 2. The viewer may then decide to watch program 1 again and so the first recorded portion 1 is played back. At the same time that the first recorded portion 1 is being played back, a second recorded portion 1 of program 1 is recorded and a first recorded portion 2 is recorded by the recording means (on different recording media, or on a same recording media as described above). The recording and playback of the two programs continues on in the manner illustrated herein to enable the viewer to watch both programs at his or her leisure. If the viewer switches to a third program or takes a break, then both programs can be simultaneously tuned in and recorded on respective recording mediums.

BRIEF DESCRIPTION OF THE DRAWINGS

FIG. 12 is a flow chart showing the steps performed to determine if its time to record based on the stored VCR control information;

FIG. 13 is a flow chart showing the steps performed to retrieve the stored VCR control information;

FIG. 14 is a flow chart showing the steps performed to record a program based on the retrieved VCR control information;

FIG. 25 illustrates another Web page in accordance with the on-line television program selection and recording aspects of the present invention(s), and shows the user of a flat screen display remote input device;

FIG. 26 shows a display of preview information of television programs in accordance with the present invention(s);

FIG. 33 illustrates a television commercial displayed with a hyper-link to related content;

FIG. 34 is a block diagram illustrating the components of a television system enabled with the inventive technology;

FIG. 35 is a block diagram illustrating the components of another television system enabled with the inventive technology;

FIG. 42 shows a portion of a programming grid displaying television schedule information.

DETAILED DESCRIPTION OF THE PREFERRED EMBODIMENTS

Figure 1:
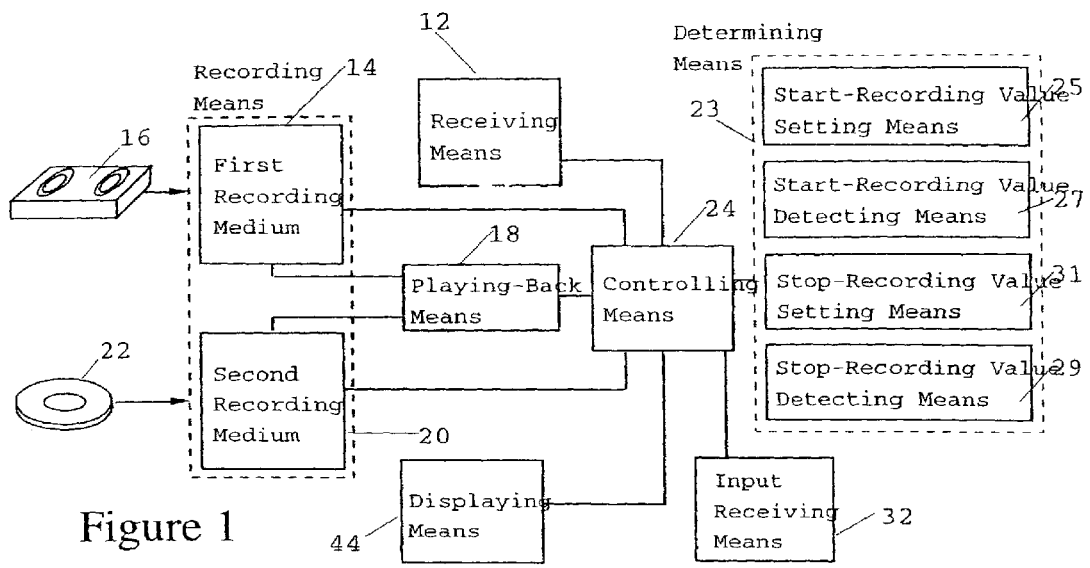
FIG. 1 is a block diagram showing an embodiment of the time shifting event recorder in accordance with the present invention(s)

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

In accordance with the present invention(s), a viewer can pause the display of, for example a television program, at any time and for any length of time (limited by the recording capacity of the recording media). The pause can take place while the program is being aired, and the viewer can return to viewing the program from the point where the pause began, even while the program continues to be received. During the pause the viewer may replay a previously recorded portion of the program, fast forward through a recorded portion, simply take a break from viewing and/or switch to another channel. Also, the present invention(s) allows a viewer to pause the display of a program and switch to another media system, such as an Internet connection. The viewer can access information from the Internet computer network while pausing the display of a television program.

As an example of this application for the present invention(s), the time sequential signal that carries a television program usually includes commercial messages. The commercial message may include information regarding an advertiser's world wide web site, or other computer network address. The address may be included as information contained in the video vertical blanking interval (a portion of the video signal that is received during a time when the video display scanning returns to the top of the screen). This address information can be accessed so that a viewer can access the advertisers computer network location for more information on a particular product that is described in the commercial message. The viewing of the program can be time shifted while the viewer accesses the advertiser's computer network site. Once the viewer has reviewed the computer network site, he can return to the television program without missing any of it.

Referring to FIG. 1, an embodiment of the inventive time shifting event recorder will be described. Receiving means 12 receives a time sequential signal representing an event. The time sequential signal may be, for example, a program broadcast via radio and microwaves for display on, for example, a television or a radio. The time sequential signal may also be transmitted through a transmission medium other than the air, such as a coaxial cable or fiber optics used by the cable television industry. Conventionally, this time sequential signal is converted into visual video signals and/or audible audio signals so that a continuous representation of the event can be viewed and/or listened to by an observer. However, if the observer is distracted from observation of the time sequential representation of the event, there is no conventional way to time shift the observable representation of the event, other than by the conventional method of recording the entire rest of the time sequential signal, waiting until the event (such as a television program) is over, and then rewinding and replaying the recorded time sequential signal.

To overcome this drawback, in accordance with the present invention(s), a first recording means 14 records in a first recording medium 16 at least one selected portion of the time sequential signal. In other words, if the viewer of a television program were to leave the room, the first recording means 14 is activated to record that selected portion of the time sequential signal received during the viewer's absence. Upon returning, the viewer activates the playing-back means 18 to retrieve at the selectable interval (the viewer's return), the recorded selected portion of the time sequential signal recorded in the first recording medium 16 during the viewer's absence. The playing-back means 18 produces a play back signal from this recorded time sequential signal portion so that the viewer can view the television program where he or she left off. While the viewer is viewing the time shifted portion of the television program, a second recording means 20 records in a second recording medium 22 another selected portion of the time sequential signal. In other words, since the television program continues on time sequentially, while the viewer is viewing the first recorded portion recorded in the first recording medium 16 the second recording means 20 continues recording the time sequential signal at the point at which the recording by the first recording means 14 is stopped so that the signal can be played back.

After the time sequential signal recorded by the first recording means 14 has been played back (so that the viewer is able to view that portion of the television program that was aired in his absence), the playing-back means 18 retrieves the portion of the time sequential signal recorded by the second recording means 20 so that it may be played back. Thus, the continuous time sequential signal representing the event (the television program) is time shifted and the viewer views the program continuously upon returning, starting from the point in time at which the viewer first stopped viewing the program. Controlling means 24 controls the first and second recording means 14,20 to record the respective selected portions of the time sequential signal. The controlling means 24 also controls the playing-back means 18 to retrieve at the selectable intervals the respective selected portions of the time sequential signal, so that the play back signal can be generated and a representation of the event can be produced in a time shifted manner. The time sequential signal can be a video signal or an audio signal. The recording media can be a magnetic tape, a magnetic disk, an electronic memory circuit (such as an EPROM, or other electronic storage device) an optically recordable disk recording medium, or any recording medium now known or later developed.

Figure 2:
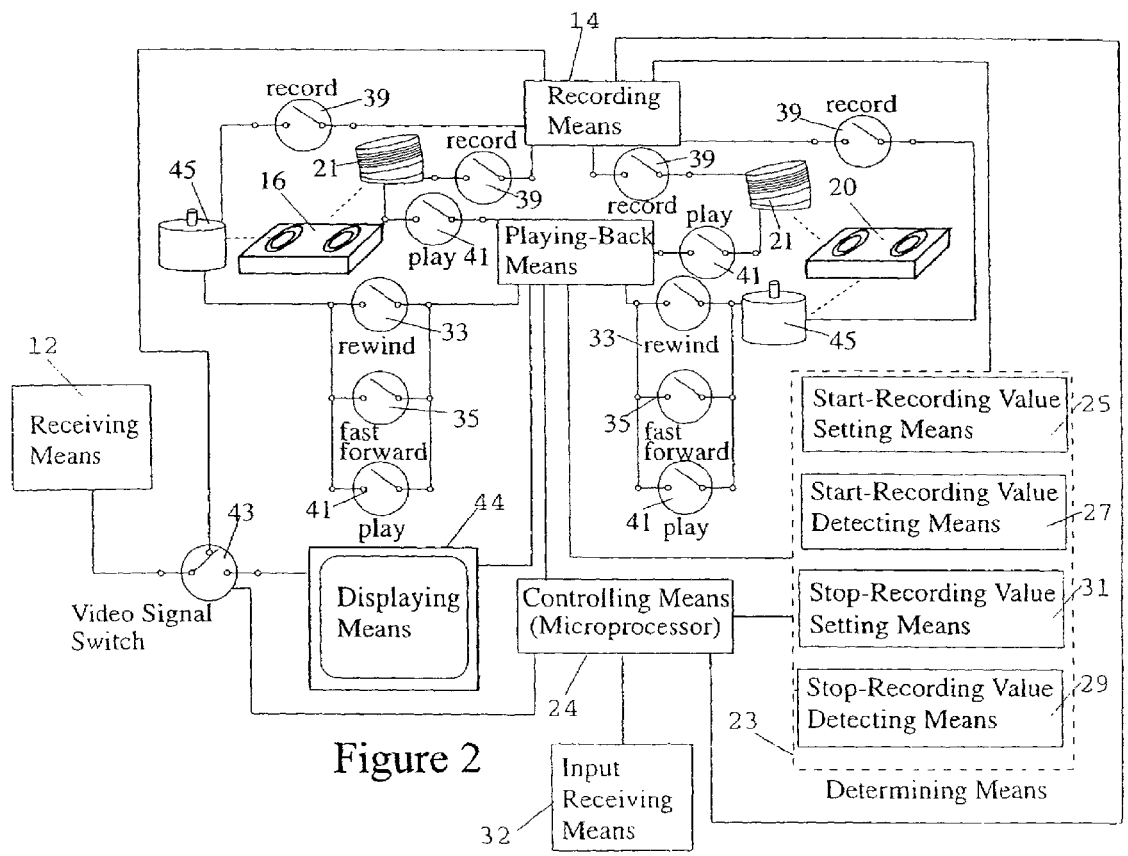
FIG. 2 is a block diagram showing in more detail an embodiment of the time shifting event recorder in accordance with the present invention(s)

FIGS. 1 and 2 show an inventive recording device for pausing the display of a received time sequential signal (TSS) on a displaying device, such as a television, computer monitor, or radio. In accordance with the present invention(s) recording means 14 is provided for recording a first recorded portion of a received time sequential signal. The recording means 14 also records a second recorded portion of the received time sequential signal Input receiving means 32 is provided for inputting a pause display command and a resume display command. The pause display command and the resume display command are instructions received from the viewer (via a remote control, voice activation mechanism, computer keyboard, or mouse, for example) to allow the control of the viewing of, for example, a television program depending on the viewer's preference.

Determining means 23 is provided for determining a beginning of the first recorded portion. The determining means 23 includes a start-recording value setting means 25 for setting a start-recording value. As will be described in more detail below, the start-recording value is utilized for determining where on the recording medium the beginning of a recorded portion of the time sequential signal is physically (or electronically) located. For example, the start-recording value may be a counter value that corresponds to where on a VCR tape or other magnetic recording tape the beginning of a recorded portion of the time sequential signal is located. The counter may be an electronic digital counter that provides a counter value signal which can be stored in a memory device, such as a RAM. Each counter value signal corresponds to a segment of the length of the VCR tape.

The start-recording value may be a tone, such as a tone having a frequency beyond the range of hearing of humans, which may be recorded on the recording medium so that after recording has taken place the location of the beginning of the recorded portion of the time sequential signal can be found by rewinding the VCR tape, or other recording medium, until the particular recorded tone is found. The tone can be found using a frequency filter that is set to the frequency of the tone signal. Further, different tones can be used to signify different portions of the recorded time sequential signal (and as will be described below, recorded tones can be utilized as a stop-recording value). The filter can be adjustable to enable recognition of each particular frequency.

The determining means 23 further includes start-recording value detecting means 27. The start recording value detecting means 27 detects the start-recording value. For example, if the start-recording value is a tone, the location of the tape where the tone is first recorded can be determined by a frequency filtering mechanism that filters out the tone frequency or that filters out frequencies that are not the tone frequency. Stated otherwise, the beginning of the recorded portion of the time sequential signal is located on the VCR tape at the location of the beginning of the recorded tone. The beginning of the recorded portion is located by locating the beginning of the recorded tone.

Playing-back means 18 is provided for playing back the recorded portions of the time sequential signal (i.e., the first recorded portion and the second recorded portion). Controlling means 24 controls the determining means 23 to determine the beginning of the first recorded portion depending on the pause display command. The controlling means 24 may thus control the start-recording value setting means 25 depending on and in response to the received pause display command. When the pause display command is received, the start-recording value setting means 25 sets the start-recording value so that after the portion of the time sequential signal has been recorded its beginning can be located.

The controlling means 24 also controls the recording means 14 so that the first recorded portion is recorded depending on the pause display command. Once the first recorded portion of the time sequential signal has been recorded and the viewer wishes to begin viewing the program again, the controlling means 24 controls the playing-back means 18 so that the first recorded portion is played back depending on the start-recording value, and depending on and in response to the resume display command. The controlling means 24 also controls the recording means 14 so that the second recorded portion is recorded while the first recorded portion is being played back.

In accordance with the present invention(s), the recording means 14 comprises at least one of a magnetic recording tape, a magnetic recording disk, an optical recording disk, an electronic recording circuit, and a recording medium. The recording medium may be, for example, a magnetic recording medium, an optical recording medium, a holographic recording medium, or an electronic recording medium. In the case of an electronic recording medium, a dynamic random access memory (DRAM) may be used. An example of such a DRAM is to be produced by NEC Corporation of Japan. NEC Corp. has prototyped a DRAM chip that can store more than 4 billion bits of information, enough to hold 47 minutes of full-motion video. Compression techniques, such as MPEG, may be employed to store a greater amount of video on such a chip. In accordance with the present invention(s), a single DRAM may be used as both the first and the second recording mediums 16,22 if it is capable of simultaneously recording and playing back information. Alternatively, two or more DRAMs can be utilized as the respective first, second (and if desired third, and so on) recording mediums. In any event, the operation of the recording and playing back of the received time sequential signal will be controlled as described herein to enable a viewer to arbitrarily pause the display of, for example, a received television program, and then later return to the viewing of the program without missing any of it and even while the rest of the program continues to be received. The DRAM may be used as a buffer memory to store a portion of the time sequential signal to allow a non-random access recording medium, such as a conventional VCR video tape to be employed as either or both of the first and the second recording mediums 16,22. In place of the DRAM, an other random-accessible data storage device can be used, such as a hard drive, removable cartridge drive, holographic memory, etc.

The start-recording value setting means 25 comprises at least one of a tone signal generator, a counter, a file allocation address generator, and a recording medium location address storing means. A tone signal generator generates a tone frequency on command. This tone frequency is recorded along with the recorded portion of the time sequential signal so that the location of the time sequential signal can be found. The tone signal can be generated only momentarily at the beginning of the recording of the recorded portion, or can be generated continuously while the recorded portion is being recorded. If it is recorded momentarily, than the location of the beginning of the recorded portion can be found by rewinding the tape while playing back the information (in reverse) that is recorded. If the tape is rewound at a speed that is different from the speed at which the information (recorded portion and tone) is recorded, then the tone frequency that is to be detected will be different from the tone frequency that was recorded. The filtering mechanism, or other tone detection mechanism (start-recording value detecting means 27) is appropriately constructed to recognize the recorded tone. Further, if the tone is recorded continuously, than the location of the beginning of the recorded portion can be found by rewinding and playing back the recorded information (in reverse) until the recorded tone is not present.

As will be described below, the use of other recording media, such as optical or magnetic disk, may utilize different mechanisms for determining the beginning and ending of the recorded portions of the tune sequential signal. The type of start-recording value setting means 25 utilized in accordance with the present invention(s) will depend upon the type of recording means 14 utilized. However, it is important to note that in accordance with the present; invention(s) the recording means 14 utilized may be comprised of two or more different types of recording media, such as a VCR tape and an optical disk. The inventive recording device can be utilize in conjunction with a VCR tape recorder or a digital recorder, for example, so that the necessary component parts (recording/play back head, motor 45, circuitry) of the inventive recorder are reduced while still allowing the unique and useful functionality of pausing the display of a time sequential signal on a displaying device 44, such as a television, depending on the viewer's preference. The start-recording value comprises at least one of a tone signal, a counter value, file allocation table address, and a location on a recording medium.

In accordance with the present invention(s), the determining means 23 may include stop-recording value setting means 31 for setting a stop recording value. The stop-recording value indicates where the end of each recorded portion of the time sequential signal is located on the recording medium. For example, another tone (which may be different than the tone of the start-recording value) may be recorded on a recording medium, such as a VCR tape, to signify the end of the recorded portion of the time sequential signal. The tone may be recorded simultaneously with the end, or immediately after the end of the recording of the portion of the time sequential signal. The invention further includes stop-recording value detecting means 29 for detecting the stop-recording value. The stop-recording value setting means 31 may comprise one of a tone signal generator, a counter, a file allocation address generator, and a recording medium location address storing means. The stop-recording value may comprise at least one of a tone signal, a counter value, a file allocation table address, and a location on a recording medium.

Stated otherwise, the inventive apparatus for pausing the display of a received time sequential signal includes recording means 14 for recording a first recorded portion of a received time sequential signal and for recording a second recorded portion of the received time sequential signal. Input receiving means 32 inputs a pause display command and a resume display command. Determining means 23 determines the beginning of the recorded portion. Playing-back means plays back the first recorded portion and the second recorded portion in a time-shifted manner. In accordance with the present invention(s), controlling means 24 controls the determining means 23 to determine the beginning of each recorded portion depending on the pause display command. When the pause display command is received, the determining means 23 makes an indication of the physical or electronic location of the beginning of the recorded portion. This indication (start-recording value) is used for finding where each recorded portion begins. The physical location of the beginning of each recorded portion may be; for example, a segment of a recording tape, or a sector and/or track of a recording disk, etc. The electronic location may be an address of a memory circuit, etc. The controlling means 24 controls the recording means 14 so that the first recorded portion is recorded depending on the pause display command. When the pause display command is received, the recording means 14 begins recording a recorded portion of the time sequential signal. The controlling means 24 also controls the playing-back means so that the first recorded portion is played back depending on the beginning determined by the determining means 23 and depending on the resume display command. The controlling means 24 also controls the recording means 14 so that the second recorded portion is recorded simultaneously while the first recorded portion is being played back. The recording of the second recorded portion depends on the received resume display command, since after taking an initial break when the viewer wishes to resume viewing the program, the viewer inputs the resume display command to the controlling means 24 (via remote control, voice activation circuitry, keyboard, mouse, or other input device). The first recorded portion is then played back, while the second recorded portion of the time sequential signal is recorded.

In accordance with the present invention(s), the controlling means 24 includes determining means 23 for determining if the ending of the first recorded portion has been played back. As long as the ending of the first recorded portion has not been played back, then the controlling the playing-back means continually plays back the first recorded portion of the time sequential signal, while simultaneously recording the second recorded portion of time sequential signal. If the ending of the first recorded portion has been played back, the controlling means 24 is effective for controlling the recording means 14 for recording an ending of the second recorded portion of the time sequential signal on the first recording medium 16. Then, the controlling means 24 controls the playing-back means for playing back the second recorded portion of the time sequential signal using the second start-recording value to determine the beginning of the second recorded portion.

In accordance with the inventive apparatus, the start-recording value setting means 25 may also be effective in setting a third start-recording value, a fourth start-recording value and so on, allowing the viewer to take any number of breaks in the viewing of the continuously received time sequential signal by recording third, fourth, etc. recorded portions that are played back in a time shifted manner. In accordance with the present invention(s), time shifting is defines as allowing a viewer to view a conventionally synchronous program in an asynchronous manner.

In the case of a third recorded portion, for example, the recording means 14 records a beginning of a third recorded portion of the time sequential signal on the first recording medium 16. The third recorded portion can be recorded on a third recording means 14, or the first and the third recording means 14 can be one in the same. If the first recorded portion has already been played back, then the third recorded portion can be recorded over it, or at least a portion of the third recorded portion can be recorded on a different location of the recording medium holding the first recorded portion. The controlling means 24 controls the determining means 23 to be effective for determining if the ending of the second recording portion has been played back. If the ending of the second recorded portion has not been played back, then the controlling means 24 controls the playing-back means for continuing playing back the second recorded portion of the time sequential signal, while simultaneously recording the third recorded portion of the time sequential signal. If the ending of the second recorded portion has been played back (i.e., the second stop-recording value is detected) then the controlling means 24 controls the recording means 14 to record an ending of the third recorded portion of the time sequential signal on the first recording medium 16. Then, the controlling means 24 controls the playing-back means to play back the third recorded portion of the time sequential signal using the third start-recording value to determine the beginning of the third recorded portion, and so on, playing back the recorded portions in the order that they were recorded, while allowing the viewer to pause the display, rewind and review, fast forward, etc., making viewing of the program asynchronous and under the complete control of the viewer.

The determining means 23 further includes stop-recording value setting means 31 for setting a first stop-recording value for determining the ending of the first recorded portion. In this case, the determining means 23 includes means for determining if the ending of the first recorded portion has been played back by detecting the first stop-recording value.

In accordance with the inventive apparatus, the determining means 23 includes means for determining if the ending of the first recorded portion has been played back. If the ending of the first recorded portion has not been played back, then the controlling means 24 controls the determining means 23 to determine if a viewer selected function is received. The viewer selected function may be, for example, rewinding, fast forward, stop, etc.

If the viewer selected function is received, then the function is performed while simultaneously continuing to record the second recorded portion (or the next recorded portion from the recorded portion that is being played back) of the time sequential signal. If the viewer selected function instruction is not received, then the controlling means 24 controls the playing-back means to continue playing back the first recorded portion of the time sequential signal, while the recording means 14 simultaneously continues to record the second recorded portion of the time sequential signal. The viewer can arbitrarily choose to review a portion of the program that has already been viewed by rewinding or otherwise returning the play back from the recording medium to that portion of the program and letting it play again. While the rewinding and replaying of the recorded portion is taking place, the program (which continues to be aired) is simultaneously and continuously recorded on, for example, the second recording medium 22 so that the viewer does not miss any of the program. Further the viewer can fast forward through commercials, or the commercials may be blanked out by detecting the information of the vertical blanking interval from the video signal.

If the ending of the first recorded portion has been played-back, then the controlling means 24 controls the recording means 14 to record an ending of the second recorded portion of the time sequential signal on the second recording medium 22. Then, the controlling means 24 controls the playing-back means to play back the second recorded portion of the time sequential signal using the second start-recording signal value, in a manner similar to the playing back of the first recorded portion.

As shown in FIG. 2, the controlling means 24 may include a microprocessor that is preset to control the performance of the operations of the inventive method as described herein. Recording means 14 records a recorded portions (first recorded portion, second recorded portion, and so on) of a received time sequential signal. The recording means 14 includes a recording/playback head 21 to magnetically record the received portion of the time sequential signal on a recording medium, such as a VCR tape. The recording means 14 also includes a motor 45 for advancing the recording medium during the recording process. The controlling means 24 controls the recording means 14 by appropriately actuating record switches 39 that activate the recording/play back head 21 and the motor 45 to effect the recording process. In the configuration shown in FIG. 2, the recording means 14 is effective for recording on a first recording medium 16 and on a second recording medium 22, although, as described herein one or more recording media may be utilized, depending on the configuration of the inventive recording apparatus.

Input receiving means 32 are provided for inputting a pause display command and a resume display command. The input receiving means 32 allows the viewer to asynchronously determine the viewing of the received program, and allows the viewer to input selected functions, such as rewind, fast forward, stop, play, pause, etc. Determining means 23 determines the beginning of the each recorded portion, and playing back means 18 for plays back the recorded portions of the time sequential signal. The determining means 23 includes start-recording value setting means 25 for setting a start-recording value, and start-recording value detecting means 27 for detecting the set start-recording value. The determining means 23 may also include stop-recording value setting means 25 for setting a stop-recording value and stop-recording value detecting means 29 for detecting the stop-recording value.

The playing back means 18 includes the recording/playback head and the motor 45 for advancing the recording medium during the playing back process. The controlling means 24 controls the playing back means 18 by appropriately actuating play switches 41 that activate the recording/play back head 21 and the motor 45 to effect the playing back process. In the configuration shown in FIG. 2, the playing back means 18 is effective for playing back recorded portions from a first recording medium 16 and from a second recording medium 22, although, as described herein one or more recording media may be utilized, depending on the configuration of the inventive recording apparatus.

The controlling means 24 controls the determining means 23 to determine the beginning of the first recorded portion depending on the pause display command. The controlling means 24 also controls the recording means 14 so that the first recorded portion is recorded depending on the pause display command. The controlling means 24 further controls the playing back means 18 so that the first recorded portion is played back depending on the determining of the beginning portion by the determining means 23 and depending on the resume display command. In addition, the controlling means 24 controls the recording means 14 so that the second recorded portion is recorded while the first recorded portion is being played back.

The controlling means 24 controls the start-recording value setting means 25 to set the start-recording value depending on the pause display command, and the controlling means 24 controls the playing back means 18 so that the first recorded portion is played back depending the start-recording value and the resume display command.

In accordance with the present invention(s), the stop-recording value setting means 25 comprises at least one of an audio signal generator, a counter, a file allocation table address generator, and a recording medium location address storing means. The stop-recording value comprises at least one of an audio signal, a counter value, a file allocation table address and a location on a recording medium.

The controlling means 24 controls the playing back means 18 and the recording means 14 to appropriately control the recording/play back head 21 and the motor 45 by controlling the actuation of switches (rewind switch 33, fast forward switch 35 and play switch 41), as well as the record switch 39 and the play switch 41. The time sequential signal is received by the receiving means 12 and sent to, for example, a video signal switch 43, which is under the control of the microprocessor of the controlling means 24. When the time sequential signal is being viewed as it is received (like the conventional manner), then the video signal switch 43 is controlled to send the received time sequential signal to the displaying means 44. When viewing of the time sequential signal is being time shifted, the video signal switch 43 is controlled by the microprocessor to transfer the received time sequential signal to the recording means 14.

Figure 3:
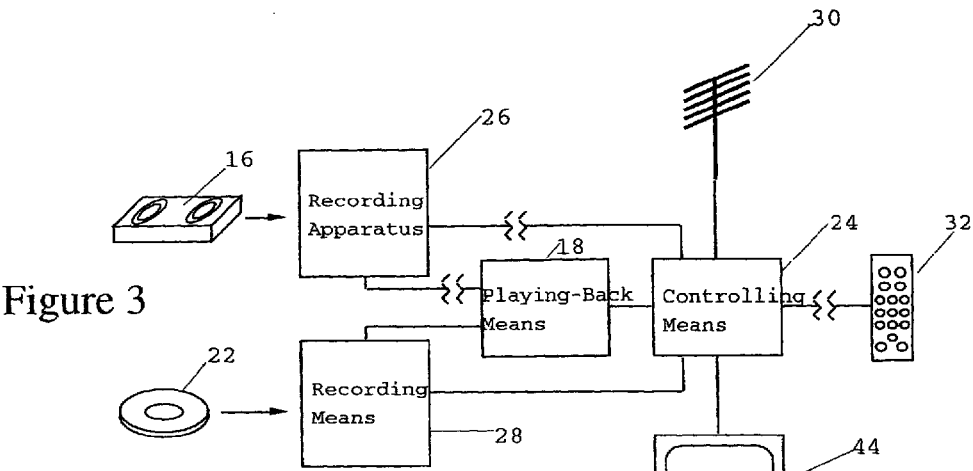
FIG. 3 is a block diagram showing another embodiment of the inventive time shifting event recorder.

Referring to FIG. 3, a block diagram of an embodiment of the inventive time shifting event recorder is shown. The inventive time shifting event recorder is used with a recording apparatus 26 capable of recording in a recordable medium at least one selected portion of a time sequential signal. In other words, the commonly used VCR is such a recording apparatus 26 which records on magnetic tape a time sequential signal, such as a television program. In accordance with the present invention(s), receiving means 12 (shown in FIG. 1) receives a time sequential signal representing an event, such as the television program. Recording means 28 records in a recording medium at least one other selected portion of the time sequential signal different from each selected portion recorded by the recording apparatus 26.

Playing-back means 18 retrieves at selectable intervals the respective selected portions of the time sequential signal that are recorded in the recordable medium of the recording apparatus 26 (VCR) and the recording medium of the recording means 28. The playing-back means 8 generates a play back signal dependent on these retrieved portions of the time sequential signal so that the television program can be viewed in the time shifted manner as described herein. Controlling means 24 controls the recording apparatus 26 and the recording means 28 to record the respective selected portions of the time sequential signal. The controlling means 24 also controls the playing back means 18 to retrieve at the selectable intervals the respected selected portions of the time sequential signal and generate the play back signal so that a representation of the event can be produced in a time shifted manner.

The time sequential signal can be either a video signal or an audio signal (or other information carrying signal) and may be received via a cable hook up or an antenna 30 which receives broadcasted radio signals. A remote control 32 can be used to input user selectable control signals to the controlling means 24 so as to control production of the representation of the event in a user definable time shifted manner.

The respective portions of the time sequential signal may be retrieved and/or stored as analog or digital data. For example, a newly developed integrated circuit which is capable of storing vast quantities of digital data may be used as the recording means which allows nearly instantaneous retrieval of the time sequential signal recorded therein. The use of such a memory circuit will reduce the complexity of the inventive time shifting event recorder to thereby reduce the cost to produce and/or the size of the device.

Figure 4:
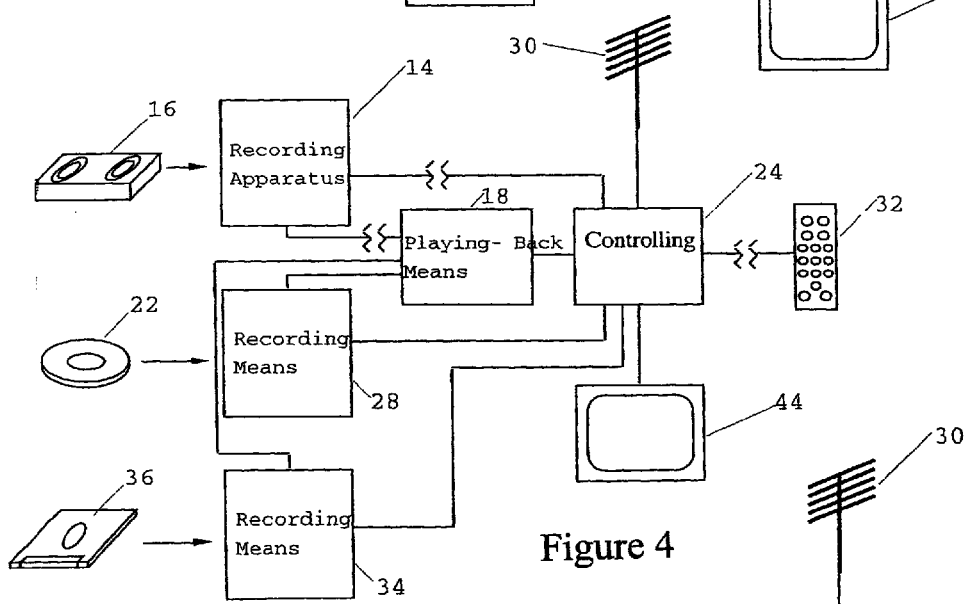
FIG. 4 is a block diagram showing another embodiment of the inventive time shifting event recorder.

Referring now to FIG. 4, in accordance with the present invention(s) a recording means 34 may be provided for recording in a third recording medium 36 at least one gap portion of the time sequential signal different from the portions recorded by the first and second recording medium 20. Each gap portion is recorded at a time when either of the first and second recording means 14,20 is not able to record the time sequential signal. In other words, if for example, one of the recording media is a magnetic tape which is being rewound while the other recording medium is playing back a portion of the recorded time sequential signal, the recording means 34 will be used to record the event (for example the television program) so that there is a continuous recordability of the television program with no lapse in continuity.

In this embodiment, the playing-back means 18 includes means for retrieving at a gap interval each gap portion of the time sequential signal recorded in the third recording medium 36 and generating a play back signal dependent thereon. The controlling means 24 includes means for controlling the recording means 34 to record each gap portion of the time sequential signal in the recording means 34. The controlling means 24 further comprises means for controlling the playing-back means 18 to retrieve each gap portion of the time sequential signal, and to generate the play back signal so that a representation of the event can be reproduced in a time shifted manner without a break in continuity caused by a time when either of the first and second recording means 14,20 is not able to record the time sequential signal.

With regard to at least some of the recording media, such as the disk type (magnetic or optic) and the memory circuit, it is possible that only one such recording medium is necessary to construct the invention. In this case, different portions of the recording medium are used and controlled to simultaneously record at one portion while playing back information recorded at another. This will further improve the device by reducing complexity and costs to make.

Figure 5:
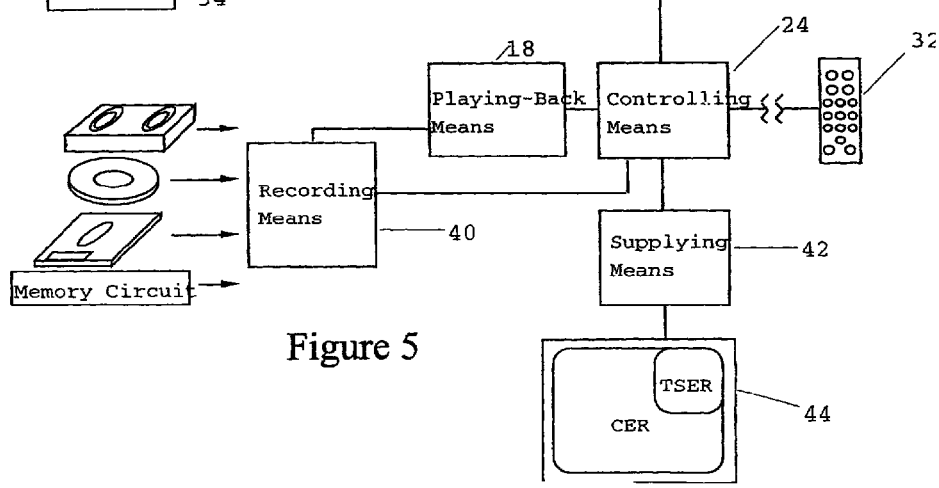
FIG. 5 is a block diagram of another embodiment of the inventive time shifting event recorder.

Referring now to FIG. 5, an embodiment of the inventive time shifting event recorder for displaying a time shifted representation of an event on a display device is shown. Receiving means 12, such as an aerial antenna 30 for receiving a broadcast signal or a cable coaxial receiver, receives a time sequential signal representing an event (such as a television program). At least one recording means 40 records in a respective recording medium at least one respective selected portion of the time sequential signal. Playing-back means 18 retrieves at respective selectable intervals each respective selected portion of the time sequential signal recorded in each recording medium, and generates a respective play back signal dependent thereon. Controlling means 24 controls each recording means to record each respective selected portion of the time sequential signal. The controlling means 24 also controls the playing-back means 18 to retrieve at each respective selectable interval each respective selected portion of the time sequential signal, so that the playing-back means 18 generates each respective play back signal.

In this embodiment of the present invention(s), as shown in FIG. 5, supplying means 42, controlled by the controlling means 24, supplies at least one of the respective play back signals and a current portion of the time sequential signal to a display device 44 simultaneously so that at least one time shifted representation of the event can be displayed simultaneously with a current representation of the event on the display device. In other words, a time shifted event representation TSER can be displayed at one portion of a television screen while a current event representation CER is displayed at another portion of the television screen. In this way, the viewer can choose to recall and review again a selected portion of the television program while continuing to view the current event representation in real time.

In accordance with the present invention(s), supplying means 42 controlled by the controlling means 24 supplies at least two of the respective play back signals to a display device simultaneously so that at least two time shifted representations of the event can be displayed simultaneously on the display device. At the user's option, two or more portions of the event can be replayed simultaneously and viewed by the viewer on a display device 44, such as a television set. As with the other embodiments, each recording medium may be a magnetic tape, magnetic disk, electronic memory circuit (such as an integrated circuit device disposed on a silicon chip), an optically recordable disk or other suitable recording medium. It is particularly noted that various means for recording information are being constantly developed. Therefore, the present invention(s) is intended to include the use of such information storage devices whether currently known or developed at such future time. As with a previously described embodiment, in accordance with the embodiment shown in FIG. 5, each recording medium can be a portion of a recordable disk so that each recording means writes to and reads from the same recordable disk. Alternatively, each recording medium can comprise a portion of memory of a same electronic memory circuit. In this case, each recording means stores information on a same electronic memory circuit. Furthermore, as with the other embodiments, each recording means may record the time sequential signal as digital data, analog data or the like.

Figure 6:
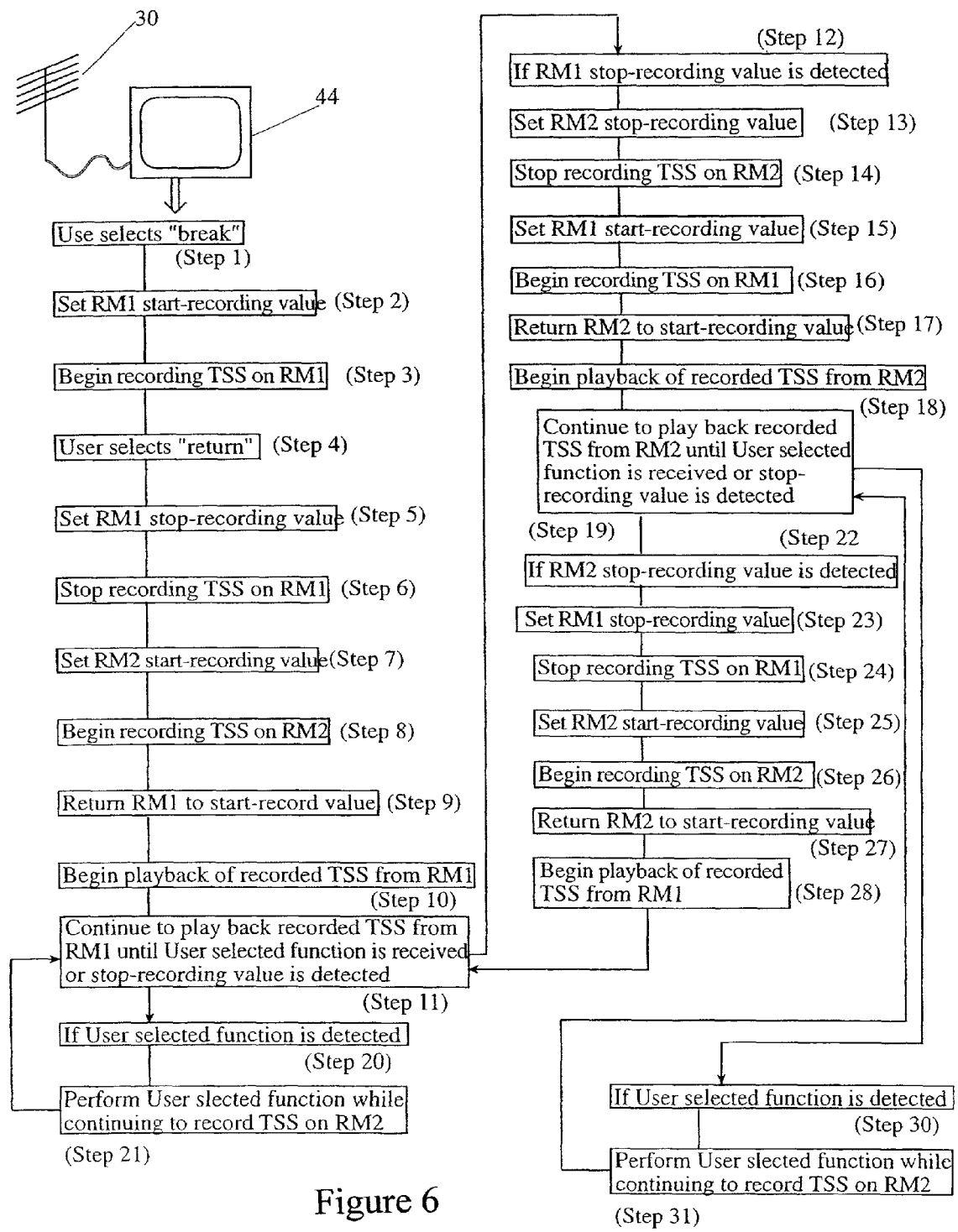
FIG. 6 is a flow chart illustrating the steps of the inventive method of pausing the display of a time sequential signal, and the steps of the operation of the inventive apparatus for the pausing the display of a time sequential signal.

FIG. 6 is a flow chart showing the operation of the inventive apparatus for pausing the display of a time sequential signal, and illustrates the inventive method for pausing the display of a time sequential signal. In accordance with the present invention(s), a time sequential signal is received via, for example, an antenna, a cable television hook up, Internet modem connection, satellite transmission or other information transfer mechanism. The information depending on time sequential signal is displayed for viewing on a television, computer monitor, radio, or other displaying device 44. A pause display command is inputted by the viewer through, for example, a remote control, keyboard, voice activation, or other command inputting mechanism. Thus, the viewer selects "break" (step one). A first start-recording value is set (RM1) (step 2). A beginning of a first recorded portion of the time sequential signal is recorded on a first recording medium 16 (begin recording TSS on RM1 (step 3)). At this point, the viewer can attend to a phone call, or otherwise take a break from viewing the program, while the program continues to be broadcast and received as the time sequential signal. The portion of the time sequential signal that occurs during the break is recorded on the first recording medium 16.

When the viewer returns, a resume display command is inputted (viewer selects "return" Step 4)). An ending of the first recorded portion of the time sequential signal is then recorded on the first recording medium 16. When the ending of the first recorded portion of the time sequential signal is recorded, a stop-recording value can be set (set RM1) stop-recording value (Step 5)). However, it is not necessary to record to set the stop-recording value, if means is provided to determine the ending of the first recorded portion of the time sequential signal. For example, it can be determined that the ending of the first recorded portion coincides with the beginning of a second recorded portion. In this case, it is not necessary to set a stop-recording value, but rather the ending of the first recorded portion is determined by determining the beginning of the second recorded portion. As an example, the beginning of the second recorded portion can be determined by noting a time (or counter value, address, track, sector, etc. depending on the recording medium) when recording on a second recording medium 22 begins, then the ending of the first recorded portion is immediately preceding that same time (or counter value, etc.). The start-recording value for the second recorded portion would signify for the ending of the first recorded portion and the beginning of the second recorded portion.

The ending of the first recorded portion is recorded on the first recording medium 16 and recording of the time sequential signal on the first recording medium 16 is stopped (stop recording TSS on RM1 (step six)). The first and the second recording mediums 16,22 may be the same disk or recording mechanism, as described herein.

Next, a second start-recording value is set (set RM2 start-recording value (step 7)). A beginning of a second recorded portion of a time sequential signal is recorded on a second recording medium 22 (begin recording on TSS on RM2 (step eight)). To recap what has occurred, a viewer or user has determined to take a pause in the display of the continuously aired program. Thus, a pause display command is inputted, and the viewer selects "break" (step one). A first start-recording value is set (step two) and a beginning of the first recorded portion of a time sequential signal is recorded on a first recording medium 16 (step three). When the viewer returns, a resume display command is inputted (step 4) a stop-recording value may be set (depending on the construction of the inventive apparatus), and the ending of the first recorded portion is recorded on the first recording medium 16 (steps 5 and 6). Since the viewer has inputted a resume display command and wishes to continue viewing the program from where the beginning of the break began, a second recorded portion of the time sequential signal must be recorded so that the portion of the continuously received signal is stored for time shifted or asynchronous viewing. Thus, a second start-recording value is set, and a beginning of a second recorded portion of the time sequential signal is recorded on a second recording medium 22. To allow the viewing to begin watching the program again, from the point the arbitrary break was taken, the beginning of the first recorded portion must he determined. This beginning is determined using the first start-recording value. Thus, RM1 is returned to the start-recording value (step 9).

A number of different inventive mechanisms for determining the beginning of the first recorded portion are described herein. After returning the beginning of the first recorded portion, the first recorded portion of the time sequential signal is then played back for viewing by the viewer (step 10). The first recorded portion of the time sequential signal is continued to be played back from the first recording medium 16, until either a viewer selected function is received (pause, rewind, fast forward, stop, play, etc.), or the end of the first recorded portion is detected. If, in step 5, a first stop-recording value has been set for the first recorded portion, then the end of the first recorded portion is determined by detecting this stop-recording value. Alternatively, the end of the first recorded portion can be determined by noting when the beginning of the second recorded portion started, by means of a counter, timer, address location, look-up table, or other such device or method. In any event, if the viewer selected function is detected (step 20) then the viewing selected function is performed while continuing to record the second recorded portion of the time sequential signal on the second recording medium 22 RM2 (step 21). After performing the viewer selected function, play back of the recorded time sequential signal continues as instructed in step 11.

If the end of the first recorded portion is determined (if the first stop-recording value or the beginning of the second recorded portion is detected (Step 12)) then a second stop-recording value can be set (depending on the construction of the inventive apparatus) signifying the ending of the second recorded portion (step 13) and recording of the time sequential signal on the second recording medium 22 is stopped (step 14). The same holds true for the second stop-recording value as holds for the first stop-recording value, wherein alternative mechanisms can be used so that the actual stop-recording value does not have to be set but the ending of the respective recorded portion can be determined by, for example, the beginning of the recording of a next recorded portion.

At this point, the first recorded portion of the time sequential signal (the part of the aired program that elapsed when the viewer took a break) has been played back for viewing by the viewer. In order to view the rest of the program, the viewing has to view that portion of the program that was received and elapsed while viewing the first recorded portion. In this example, that portion has been recorded on the second recording medium 22 as the second recorded portion. However, in order to later view the portion of the program that is received while viewing the second recorded portion, another recorded portion (third recorded portion) of the program has to be recorded. Since the portion of the program recorded on the first recorded medium has already been played back, the first recording medium 16 can be used again for recording the third recorded portion. Alternatively, a third recording medium can be used, so that the viewer can rewind back the portions of the program recorded on the first recording medium 16, or can obtain a final full copy of the recorded program for viewing later. A final full copy can be re-recorded onto another recording medium, or the recorded portions can be appended to and spliced together onto one of the recording media of the inventive apparatus.

Thus, a third start-recording value is set for the first recording medium 16 (or third recording medium) (step 15). The third recorded portion of the time sequential signal thus is recorded on either the first recording medium 16 or a third recording medium. The beginning of the third recorded portion is recorded in step 16. For the viewer to watch the second recorded portion, the beginning of the second recorded portion must first be determined. The second recording medium 22 is returned to the second start-recording value (step 17). Play back of the second recorded portion of the time sequential signal from the second recording medium 22 can then begin (step 18). The play back of the second recorded portion of the time sequential signal from the second recording medium 22 continues, until either a viewer selected function is received or the second stop-recording value is detected (step 19). As has been described above, the second stop-recording value is set so that the ending of the second recorded portion can be determined. However, alternative mechanisms can be employed to detect the ending of the recorded portions, such as determining when the third recorded portion begins. If the second stop-recording value or the beginning of the third recorded portion is detected (step 22), then a third stop-recording value is set (step 23). Again, it is not necessary to set the third stop-recording value if alternative mechanisms are employed to detect the ending of the third recorded portion. The recording of a third recorded portion of the time sequential signal on the first recording medium 16 (or the third recording medium) is stopped (step 24). The exact timing of the stopping of recording of the recorded portions and the setting of the start-recording and stop-recording values can vary. For example, the start-recording value can be set just before or simultaneously with the beginning of the recorded portion, and the stop-recording value can be set just after or simultaneously with the ending of the recorded portion.

If the ending of the second recorded portion is determined and the time sequential signal continues to be received, than a fourth start-recording value is set for a fourth recorded portion of the time sequential signal. The fourth recorded portion is recorded on the second recording medium 22 (or third recording medium or forth recording medium or first recording medium 16 depending on the configuration of the inventive recording device (Step 25)). The beginning of the fourth recorded portion of the time sequential signal is then recorded (step 26), and the recording medium on which is recorded the third recorded portion is returned to the beginning of the third recorded portion (step 27). Play back of the third recorded portion of the time sequential signal begins (step 28) and continues until either a viewer selected function is received or the end of the recorded portion is determined (step 11).

The inventive apparatus can be constructed from different electronic components depending on the desired operational parameters such as length of recording capacity, speed of operation, compatibility with existing devices, such as VCRs, modems or cable television set to boxes, etc. The inventive apparatus can be configured to utilize different types of recording media, such as a magnetic recording medium, a magnetic recording medium, an optical recording medium, a magneto-optical recording medium, a phase change recording medium and an electronic recording circuit. The start-recording value setting means may include means for setting a predetermined start-recording value comprised of at least one a predetermined counter value, a predetermined file allocation table address, of a predetermined location on a recording medium and a predetermined random access memory address for setting a predetermined start-recording value for determining the beginning of the recorded portions of the time sequential signal. The start-recording value setting means and the stop-recording value setting means may include a tone signal generator for generating a tone signal, a file allocation table address generator for generating and storing a file allocation table address, a counter for generating and storing a counter value and a random access memory address generator for generating a random access memory address as the start-recording value and the stop-recording value for determining the beginning and the ending of the recorded portions of the time sequential signal.

In accordance with another aspect of the present invention (s), a computer microprocessor is operated in accordance with an algorithm for controlling the recording of a television program via received data instructions. The algorithm includes providing access to a computer network source of program information and data instructions, such as through an Internet modem connection, or via a television signal. The selection of a television program to record from the received program information is accomplished by displaying the program information. The user is provided with a remote control, mouse, keyboard or other inputting means to navigate through the displayed program information. When a television program is selected, the user's computer receives data instructions from the computer network source depending on the selected television program The data instructions are stored and used to determine when to record the selected television program. A recording apparatus, such as a VCR, is controlled to record the selected television program depending on the stored data instructions.

Figure 7:
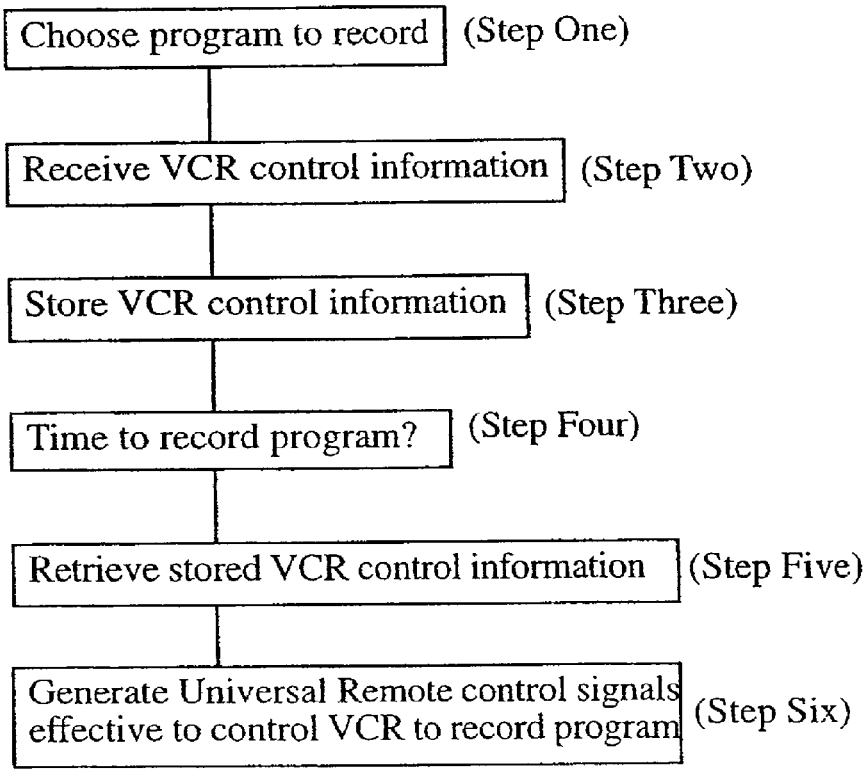
FIG. 7 is a flow chart showing the basic steps performed at the user-end for programming a VCR in accordance with the present invention(s)

FIG. 7 shows the general steps of the inventive method performed by the user's recording apparatus (VCR) or computer link to a network such as the Internet. In accordance with the present invention(s), an Internet or network site is provided that contains the program information for particular cable television systems. Each television system has assigned to it one or more Internet pages that contain the update-able programming information for the particular system. The user accesses the web site, chooses the television system appropriate for that user, and is provided with the programming information from the appropriate web pages. The user selects from the programming information those television programs that are to be recorded. The user first chooses a program to record (step one). VCR control information is received (step two) from the network. The VCR control information includes data such as time, channel, duration, repeat, date, etc. necessary to specify the program that has been selected to be recorded. The VCR control information is then stored (step three). A system clock provided in the recording apparatus or digital appliance is used in conjunction with the stored control information to determine when to begin the recording. The time and date function operation of the present invention(s) can be accomplished in a manner similar to the commonly known calendar keeping computer applications such as Now Up-to-Date from Now Software, Inc., or in a manner similar to typical VCR programming.

By comparing the current time and date information with the stored VCR control information, it is determined if it is time to record a program (step four). If it is time to record a program, then the VCR control information such as program and duration is retrieved (step five) If the user's apparatus is controlling a VCR, than a universal remote control signal is generated, effective to control the VCR to record the program (step six). On the other hand, the VCR itself may include the components of the inventive apparatus.

Figure 8:
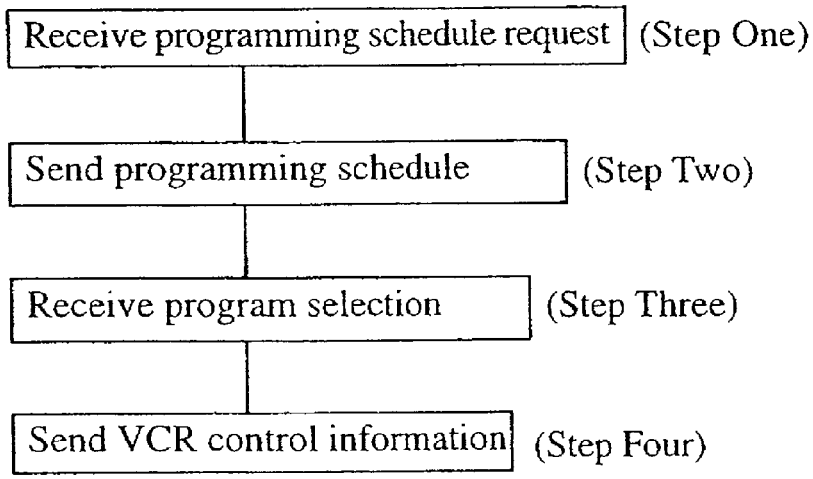
FIG. 8 is a flow chart showing the basic steps performed at the server-end for programming a VCR in accordance with the present invention(s)

FIG. 8 shows the steps performed at the server when the user accesses the web site. A programming schedule request is received by the network server (step one). The programming schedule is then sent to the user (step two). The user then chooses the program to record (FIG. 7, step one), and sends the appropriate data to the network server. Upon receiving the data of the choice of the program to record, the server retrieves the program selection (step three) and then sends the VCR control information (step four).

Figure 9:
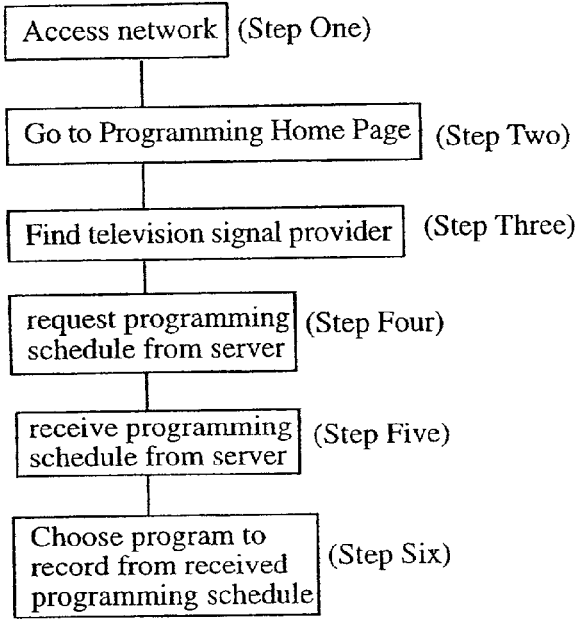
FIG. 9 is a flow chart showing the steps performed when the user chooses a program to record.

FIG. 9 is a flow chart illustrating the step of choosing which program to record (step one, FIG. 7). In order to choose which program to record, the user must first gain access to the network (step one), and then go to the programming home page (step two). The user then finds the appropriate television signal provider (step 3), and requests the programming schedule from the server (step four). The server then sends the programming schedule to the user (step two, FIG. 8). This information is received from the server by the user's apparatus (step five). The user then reviews the program schedule and chooses which program to record from the received programming schedule (step six).

Figure 10:
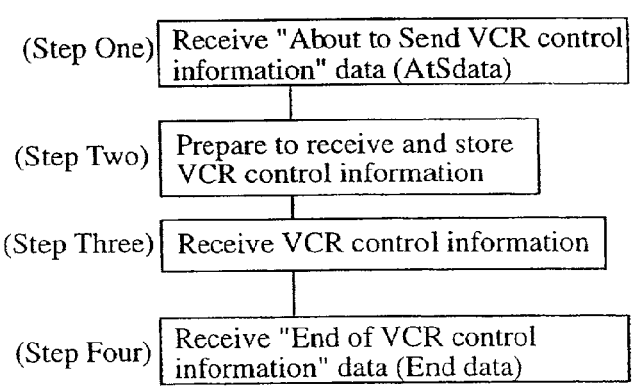
FIG. 10 is a flow chart showing the steps performed when the user receives VCR control information.

FIG. 10 is a flow chart illustrating the steps of receiving VCR control information (FIG. 7, step two). The user receives an about-to-send VCR control information data from the network server (step one). The user's apparatus (digital television, computer, set top box, etc.) containing the inventive device is then operated so that is prepared to receive and store VCR control information (step two). The VCR control information is then received (step three) and after the reception has been completed, an end-of VCR control information data is received (step four) from the network server. Thus, the user's apparatus is operated so that it can effectively receive the VCR control information.

Figure 11:
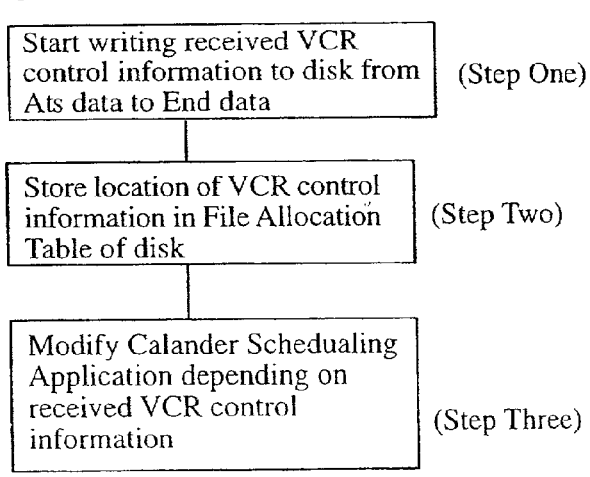
FIG. 11 is a flow chart showing the steps performed when the VCR control information is stored.

FIG. 11 shows the step of storing the VCR control information (step three, FIG. 7). The user's apparatus begins writing the received VCR control information to a hard drive or other storage medium (step one) depending on the about-to-send VCR control information data (FIG. 10, step one) and the end-of VCR control information data (FIG. 10, step four). For example, the location of the VCR control information may be stored in the file allocation table of the hard drive (step two). A calendar scheduling application is operated depending on the VCR control information (step three). The calendar scheduling application runs in a manner similar to that of a calendar scheduling computer application or VCR programming algorithm.

FIG. 12 shows the step of determining whether it is time to record the program (FIG. 7, step four) The date information and time information is loaded for the stored VCR control information into the CPU's memory (step one). The system clock and date data are checked (Step two). It is determined if the system clock and date data equal the time information of the stored VCR control information (step three). If the current system clock and date data does equal the time information of the stored VCR control information, then it is determined that it is time to record the program (step four).

FIG. 13 shows the steps of retrieving the stored VCR control information (FIG. 7, step five). The function information, duration information, channel information, repeat-record information etc., are retrieved from the VCR control information stored on the hard drive (step one). In order to operate the inventive apparatus, the stored VCR control information may need to be re-written from a hard drive to RAM (step two) or otherwise available for controlling the recording operation or remote control signal generator.

FIG. 14 is a flow chart of the step of generating the universal remote control signals effective to control a VCR to record a program (FIG. 7, step six). The universal remote control signals are generated (in the manner of the well known universal remote controllers) as necessary to control the recording apparatus or digital appliance (VCR, set top box, computer or television) to tune in the correct channel and to control the VCR to begin recording the selected program (step one). The received television signal is recorded from the selected channel for a time depending on the duration information contained in the VCR control information (step two).

Figure 15:
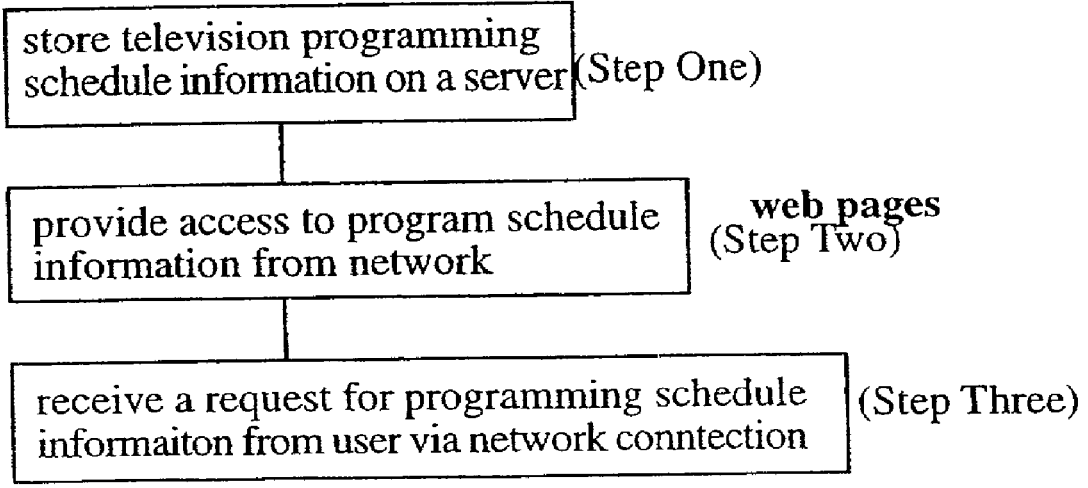
FIG. 15 is a flow chart showing the steps performed when the server receives programming schedule request.

FIG. 15 is a flow chart showing the step of receiving a programming schedule request by a network server (FIG. 8, step one). Television programming schedule information is stored on a server (step one). Access is provided to the programming information from a network, such as the Internet (step two). In this case, the access may be in the form of web pages that may be accessible after screening a user via a password, or the information may be universally retrievable by anyone with access to the network. The information will only be usable by users who have an apparatus that can be effectively controlled via the downloaded VCR control information. In order to further ensure that only the appropriate users have access to the system, a user password may be required as is typically done at web sites on the Internet. Program information may be supplied to the user through a number of vehicles. The user may subscribe to a service that updates the program schedule and VCR control information via the Internet, television signal (described below), email, BBS, modem and/or via a computer disk sent in the mail. In the case of the flow chart illustration, a request is received for programming schedule information from a user via a network connection (step three).

Figure 16:
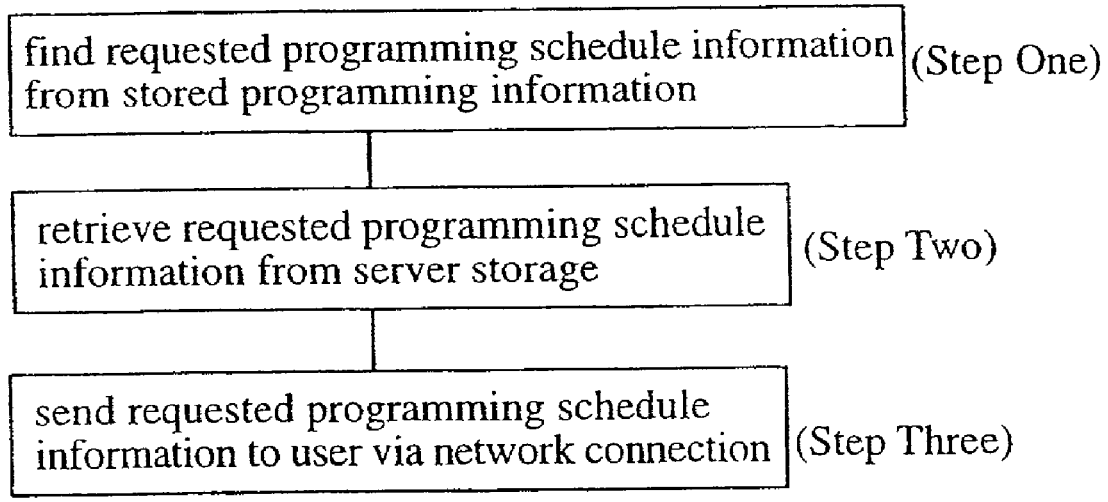
FIG. 16 is a flow chart showing the steps performed when the server sends a requested programming schedule.

FIG. 16 is a flowchart showing the step of sending programming schedule information (FIG. 8, step 2). The requested programming schedule information is found from the stored programming information on the server using a conventional server search and retrieve algorithm (step one) such as that available for UNIX, Macintosh, Sun, Microsoft-software based servers. The requested programming schedule information is retrieved from the server storage (step 2) and sent to the user via the network connection (step three).

Figure 17:
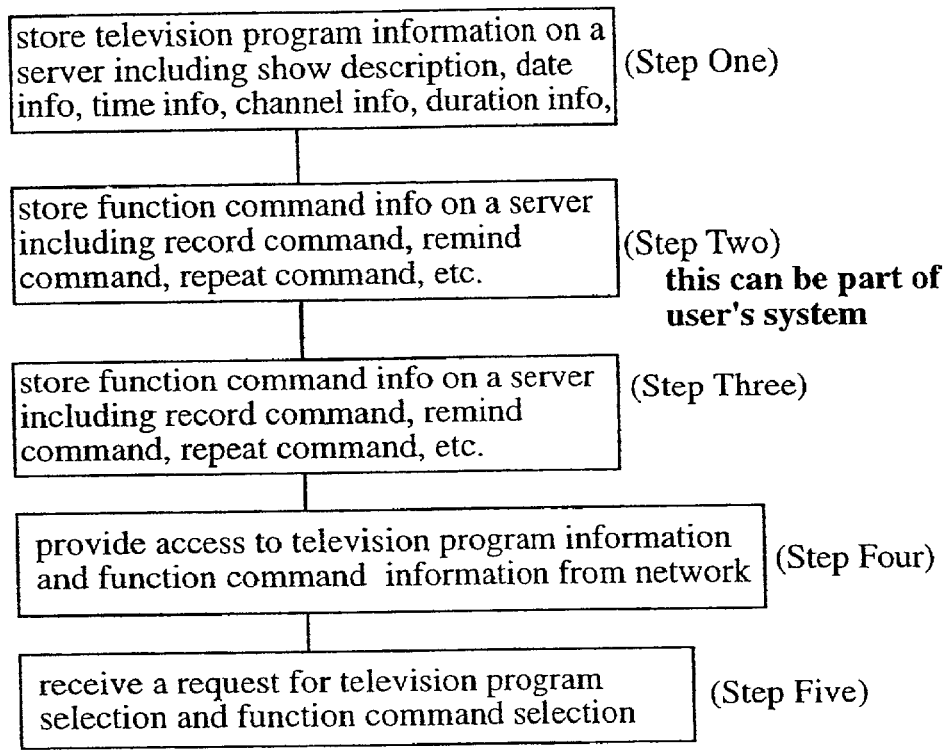
FIG. 17 is a flow chart showing the steps performed when the server receives a program selection.

FIG. 17 is a flowchart showing the step of receiving the programming selection (FIG. 8, step three). The television programming information is stored on a server. The stored television programming information includes descriptive data such as the show description, date, lime, channel and duration information (step one). The function command data or VCR control information is stored on a server including functions such as a record command, remind command, repeat command (step two). Access is provided to the television program information and the function command information from a network, such as the Internet (step four). A request is received for television programming selection and function command selection by the server from the user (step five).

Figure 18:
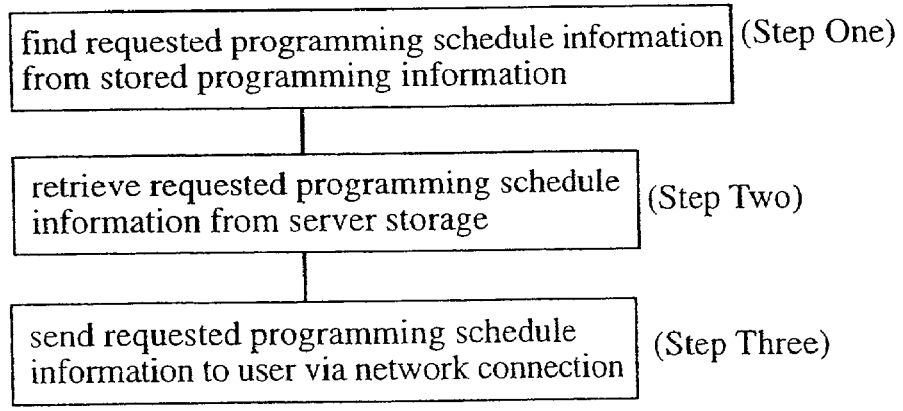
FIG. 18 is a flow chart showing the steps performed when the server sends VCR control information.

FIG. 18 is a flow chart showing the step of sending VCR control information (FIG. 8, step four). The requested programming schedule information is found from the stored programming information using a conventional database type algorithm (step one). The requested programming schedule is retrieved from the server storage (step two) and sent to the user via the network connection, such as the Internet, or the television signal (described below) (step three).

Figure 19:
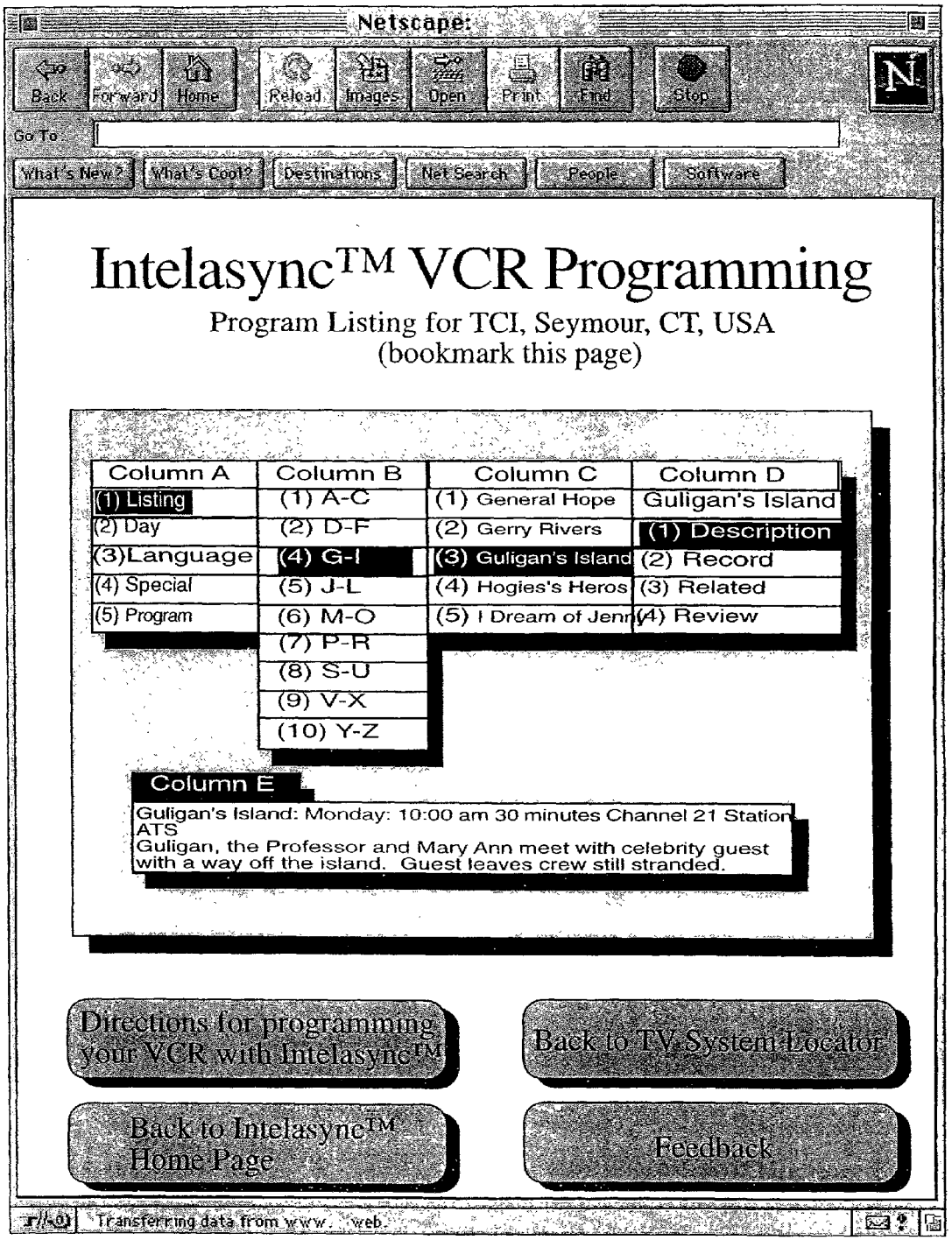
FIG. 19 illustrates a Web page in accordance with the on-line television program selection and recording aspects of the present invention(s)

FIG. 19 illustrates a Web page from a Web site that would be available on-line in accordance with another aspect of the present invention(s). In this case, the Web page is being displayed on a television or computer monitor using a conventional Web browser, such as such as Netscape Navigator. The Web site is navigable by the user so that the appropriate program listing for the user's cable, broadcast or satellite television channels can be located. Specific portions or the Web site include web pages that are specific for particular television system providers. The information contained in these Web pages can be made accessible to the user through an Internet connection, or via other information transfer mechanism. For example, a system such as the intercast system, developed by Intel, can be used to embed the information in web-like pages carried within the television signal. The inventive modification of the intercast information may embed the VCR control information described herein along with the television programming information. For example, the VCR control information may be provided as binary ASCII-format character strings that are assigned specific control functions and that can be ported to computer programs running under a variety of computer operating systems. The VCR control information (and/or the television program information) might also be provided in a special television channel on a cable system. In any event, the present invention (s) can include a universal remote control system, along the lines of the well known VCRPlus, to control a universal remote included in, for example, the inventive set top box. The universal remote sends the signals to the VCR for recording.

As shown in FIG. 19, this Web page (from the Internet), or web-like page (from the television signal), is appropriate for the TCI cable system serving Seymour, Conn. Thus, the television program schedule available through navigation of this Web page (including hyper-links to other pages) will include the programming information for this particular television signal provider. The user is asked to bookmark the Web page so that in future on-line sessions the Web page is easily accessible showing the television program schedule information appropriate for the user's television. The page of the Web site shown in FIG. 19 illustrates program selection, screening and searching options available in accordance with the present invention(s). In this case, the user can search for a television program by first selecting one of the options under column A. These options include "listing", "day", "language", "special" and "program". In the example illustrated in FIG. 19, the user has selected the option "listing". Appropriate and well known network programming languages, such as HTML and Java or the like, are used to create the Web site pages.

In the example page shown, when the user selects "listing" in column A, column B will pop up or become activated presenting the options of the letters of the alphabet to the user. The user in this case has selected letters G-I or option 4. With this option selected, column C pops up with a list of television programs that start with the letters G-I. The user selects from column C the program "Guligan's Island" and column D pops up with various options. In this case, the user selects the "description" option. Column E then pops up with a description of "Guligan's Island" along with related programming information. Also shown on the Web page illustrated in FIG. 19 are navigation buttons that make additional information available to the user, such as instruction on using the inventive system to program a VCR.

Figure 20:
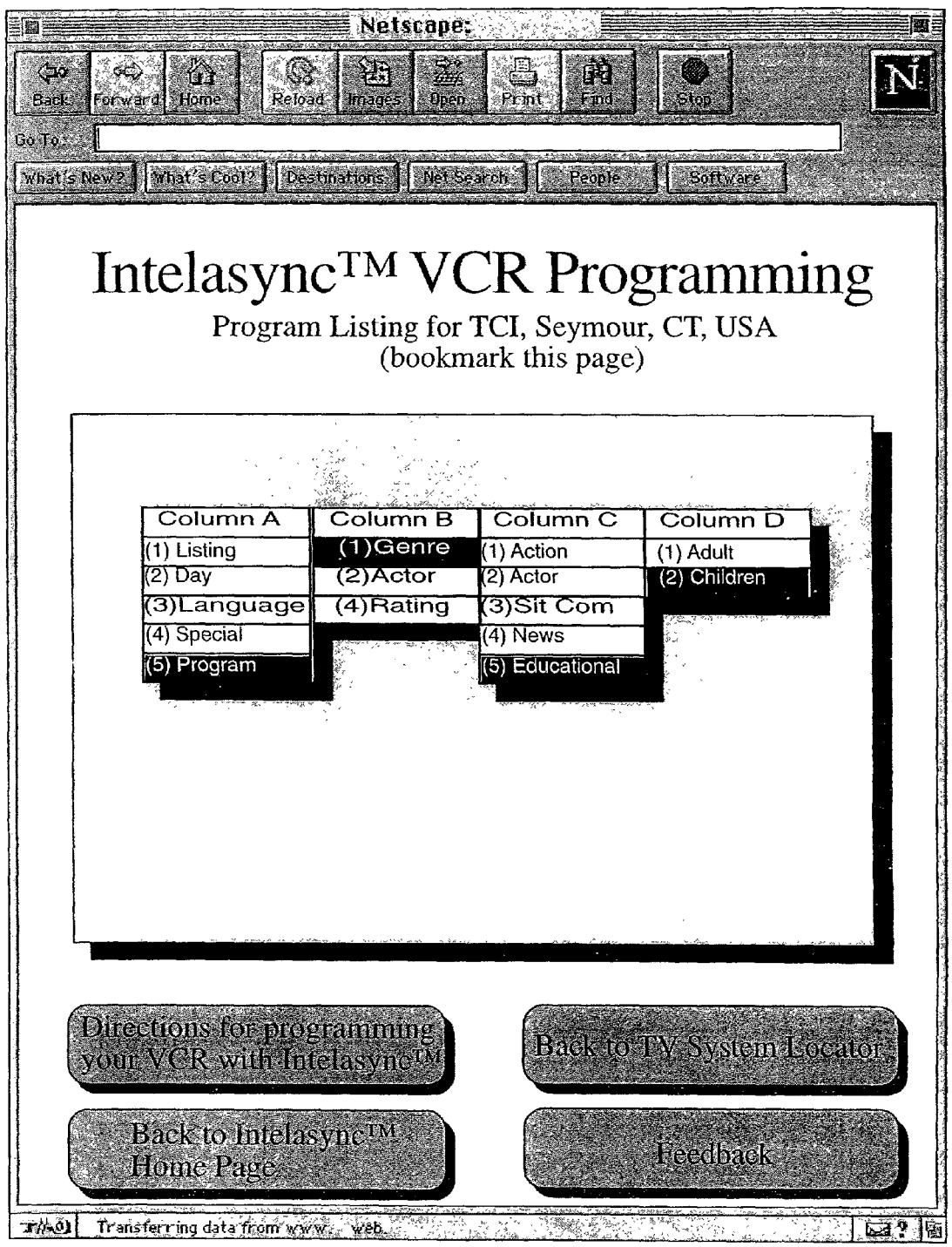
FIG. 20 illustrates another Web page in accordance with the on-line television program selection and recording aspects of the present invention(s)

FIG. 20 shows another page from the Web site, with other navigation options selected. In this case, the user has selected the "program" option in column A. This brings up the option shown in column B, and in this case the user has selected the option "genre". This selection causes column C to pop up, where the user can select from a number of different genres. The user has selected the genre "education", causing column D to pop up. Through the navigation of this Web page the user has chosen to search for programs in the children's education genre.

Figure 21:
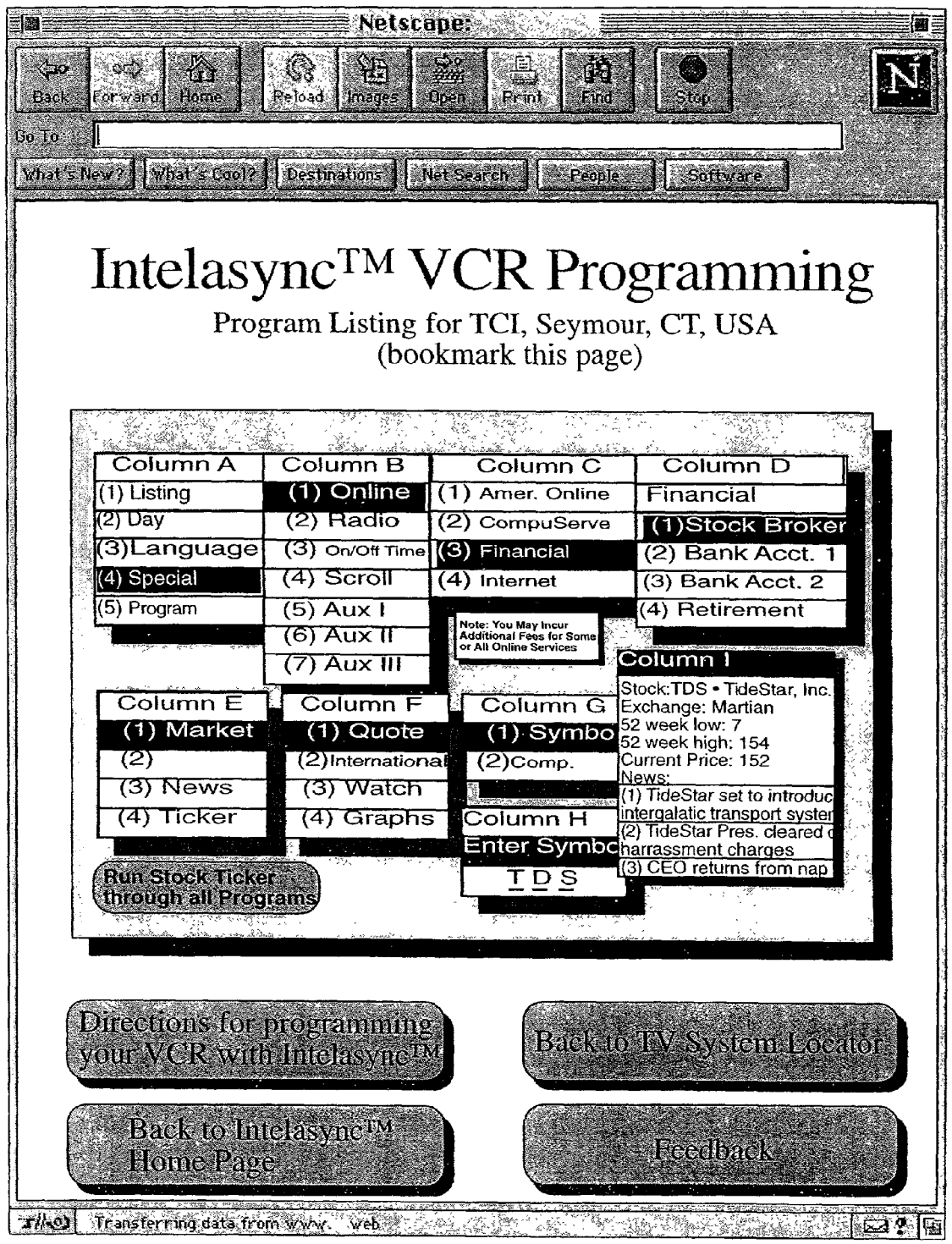
FIG. 21 illustrates another Web page in accordance with the on-line television program selection and recording aspects of the present invention(s)

FIG. 21 shows the menu options that can be available when the user selects the "special" option from column A. In this case, column B presents the user with the options of going on-line, listening to the radio, selecting an on-off timer, and automatic scroll through of the web page. The user chooses the on-line option, and column C pops up, giving the user the on-line choices. The user chooses to peruse a financial on-line service, and column D pops up. The user can gain access to a stock broker, bank accounts, etc., and has selected the stock broker option, bring up column E From column F, the user selects the "market" option, which brings up column F. From column F, the user selects the "quote" option, where the user can find a real time stock price quote, and selects searching by stock symbol in column G. Column H pops up, where the user enters the desired stock symbol. An online search is performed in the background to obtain the news of the desired stock, and this news is summarized in column I. Of course, this news can include hyper-links to related sites where more information on the stock is available.

Figure 22:
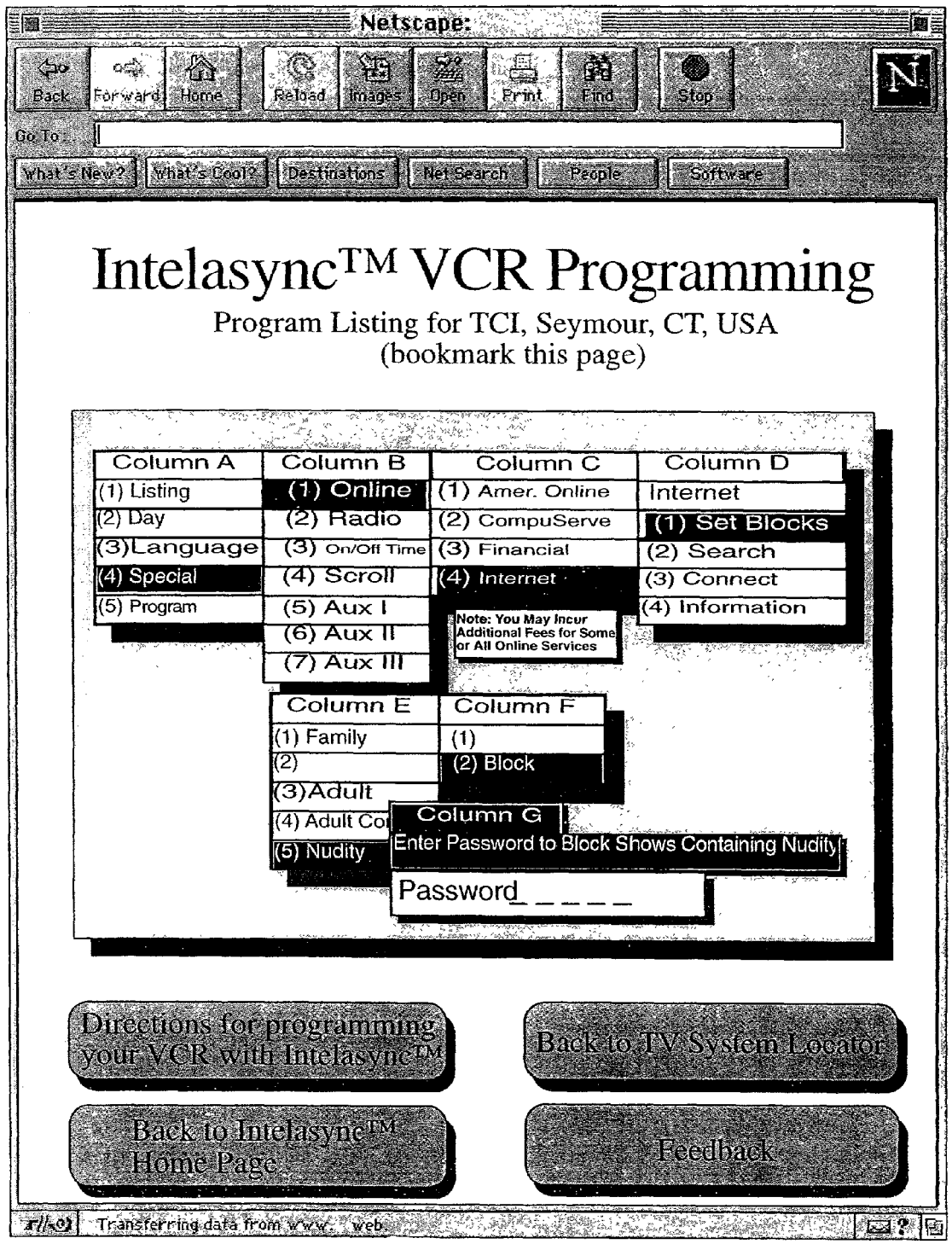
FIG. 22 illustrates another Web page in accordance with the on-line television program selection and recording aspects of the present invention(s)

FIG. 22 shows the Web page displayed when the user has selected "special" (column A); "on-line" (column B); and "Internet" (column C). In this case, column D pops up and the user is given the option of setting blocking information (as described in more detail below), searching, connecting, or obtaining more information. The user selects to set the blocking parameters, causing column B to pop up displaying a list of content rating categories. The user selects to block access to content containing nudity. Column F pops up and the user selects "block". The user can later allow access to such content by changing "block" to "access". Column G asks the user to input a password to verify that the user is appropriate (i.e., a parent).

Figure 23:
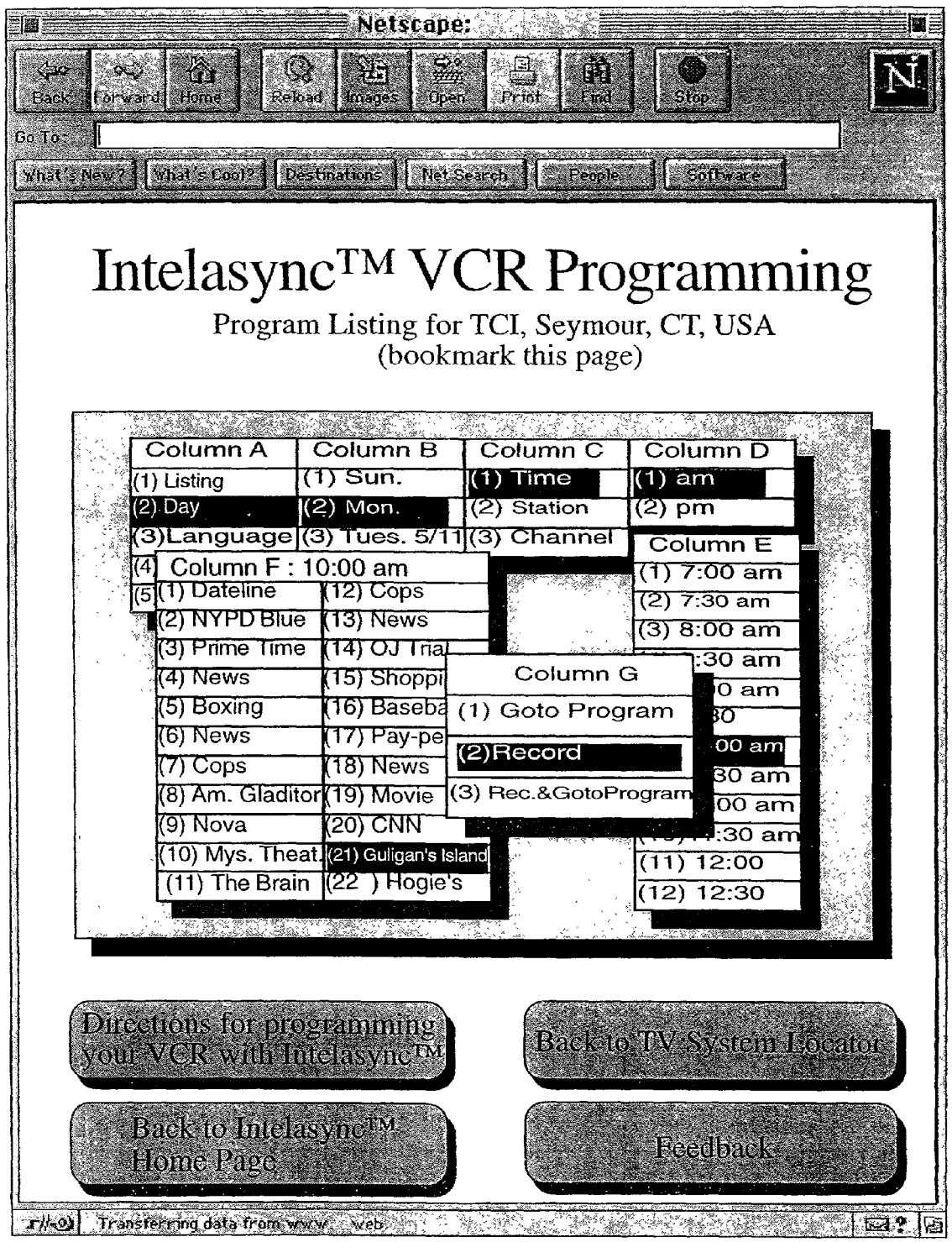
FIG. 23 illustrates another Web page in accordance with the on-line television program selection and recording aspects of the present invention(s)

FIG. 23 shows the Web page that is display when a user navigates through the "day" option of column A. Column B pops up with a list of the days of the week (alternatively, the user can input a specific date). Columns C, D and B pop up and the user makes the desired selections. Column F pops up with the program schedule information. Once the user selects a program, column G pops up with the options of either going to the program (if it is available for viewing), recording the program with a VCR (as described herein), or viewing and recording the program.

Figure 24:
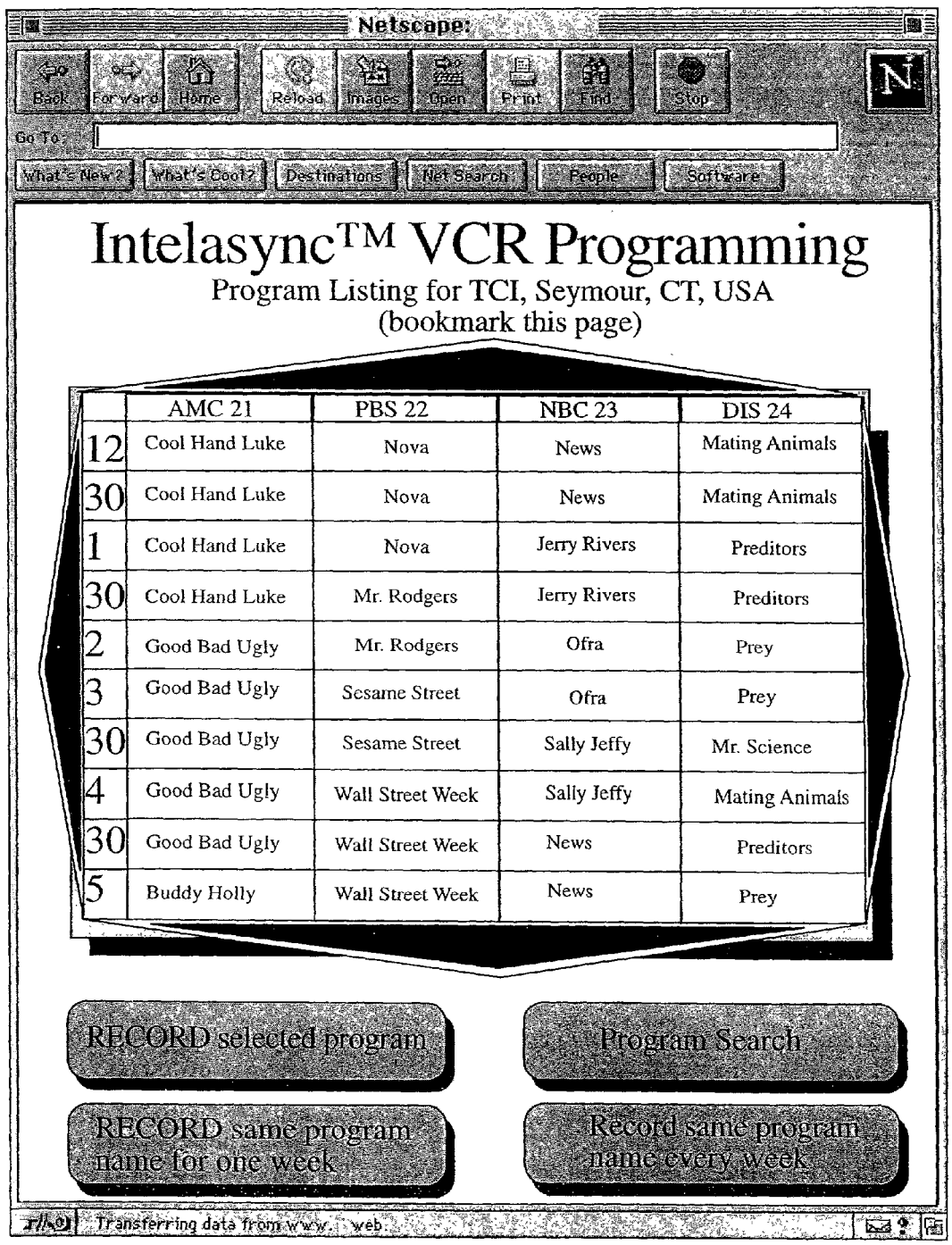
FIG. 24 illustrates another Web page in accordance with the on-line television program selection and recording aspects of the present invention(s)

FIG. 24 shows a web page with a program grid that can be scrolled by clicking on the arrows at the edges of the grid (or by a remote control arrow button). The grid shows the station name and channel for each of the television channels available on the user's system. The web page shown, may be accessed, for example by selecting a hypertext link displayed on the television screen or computer monitor.

FIG. 25 shows the web page displayed on a television screen or computer monitor and shows the use of a flat screen display panel remote input device. The flat screen display panel can show the related content while the television or computer monitor shows the program (or vice-versa). The user can pause the display of the television program at any time to concentrate on the information displayed on the flat screen. On-line or embedded content can be synchronized with the program to enhance the viewing experience and open up new entertainment and educational possibilities. Further, the interactive nature of the on-line connection will allow the user to provide feedback to the television program producer during a live broadcast. The flat screen display includes a video driver circuit and may receive the information for display via a wireless or wired link with the computer, digital television, Internet appliance, multi-featured multi-media appliance, etc.

FIG. 26 shows a display, such as a television or monitor, used in conjunction with the inventive set top box. In this case, the display is showing a preview program search and selection screen which the user can navigate via keyboard instructions, remote control buttons and/or the use of scroll bars. The display screen shows a number of program frame stills that are updated periodically by tuning in the individual channels and capturing a frame of the video signal. A conventional frame grab device, such as that available from miro Computer Products AG can be employed, each frame is stored in memory, and displayed in a multiple picture-in-a-picture (p-i-p) type display as shown. Alternatively, the individual channels can be displayed with a "live" feed by employing multiple tuners and controlling the image generated on the television or monitor (in a manner similar to the well-known p-i-p display) so that each of the channels is displayed simultaneously.

A number of scroll bars are displayed at various locations on the television or computer screen The scroll bars, where appropriate, include scroll arrows which when activated scroll the information contained in the scroll bars in the direction of the arrow. A channel type scroll bar provides the user with a number of channel type options for narrowing down the programming selection. In this case, "all programs" channel type has been activated. Thus, a channel available scroll bar displays all of the channels available for viewing by the user from the particular television system The user can then activate those channels or groups of channels that are to be displayed in the updated individual program frame stills. Volume and channel scroll bars are provided, as well as function selection scroll bars. The function selection scroll bar allows the user to toggle between the various television and data signal receiving, displaying and manipulating devices, such as a VCR, computer television, etc In the top right hand corner a display triangle is provided. This display triangle toggles the display between, for example, the preview screen shown here and a television program, on-line web site, pre-taped program or computer application. When viewing the selected program, the viewer can return to, for example, the preview screen by clicking on the location of the display triangle (which may be faint or invisible).

Figure 27:
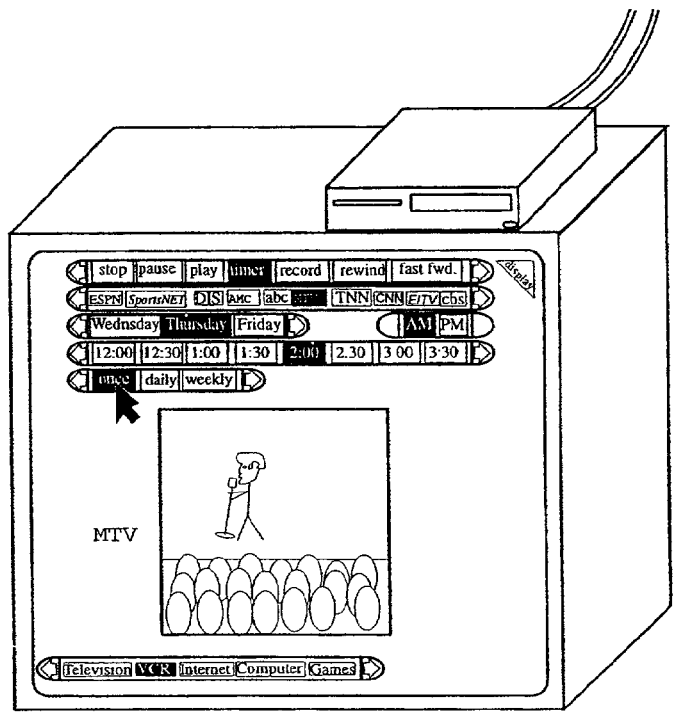
FIG. 27 shows a screen for navigating through viewing, connection, recording and downloading options available in accordance with the present invention(s)

FIG. 27 shows a screen displaying the scroll bars that pop up as the user navigates through the viewing, connection, recording and downloading options available via the present invention(s). The bottom scroll bar gives the viewer the options available for the received television or data signal. In this case, the user has selected the VCR function icon. A scroll bar pops up providing the options available for controlling the VCR. The user has selected the timer function, and additional scroll bars pop up as the viewer navigates through and sets up the future VCR recording of a desired television program. In the example shown, the user easily navigates and programs one-time VCR recording of an MTV program on Thursday at 2:00 am.

Figure 28:
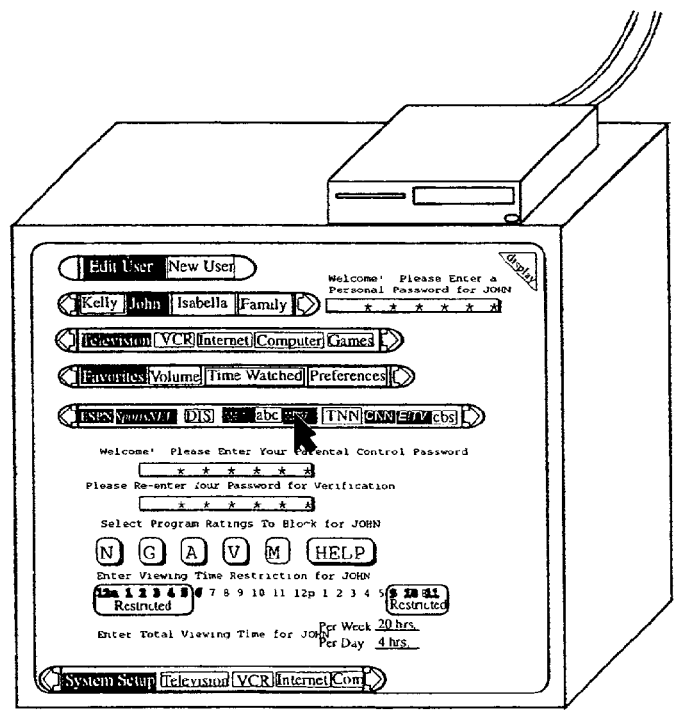
FIG. 28 shows a screen for setting program and on-line access restrictions.

FIG. 28 shows a screen wherein access to programming is selectively controlled depending on a particular user's preferences and parental control. A previous user's profile is edited by first selecting the "Edit User" icon from the first scroll bar. The user "John" is selected and the user's personal password is requested by the system and then inputted by the user. This particular user's preferences may now be edited making a television viewing and data acquisition profile specific to that user's education, business and entertainment desires. This profile is stored in the systems (e.g., computer CPU) memory and used to search for and suggest viewing and data choices. Parents can also control the viewing times and content available to their children. The V-Chip, or other filtering method (such as that described herein) and/or device, can be utilized to prevent access to content deemed inappropriate to particular viewers, such as children. The program ratings to block can be set by the parent. The parent can also set the times of the day, as well as the hours per day and week, during which the child can use the television or computer. Each time a user log on or begins a television viewing session he or she must input their identifying password. The duration of the viewing session is determined using the system clock or other time keeping mechanism. The time of the viewing sessions for the user are cumulatively added, and the sum subtracted from the time allowed for that particular user. Once the user has used up all the allocated time (for the day and/or for the week), the television shuts off or the screen goes blank. Thus, parents can set a maximum number of hours per day and week that their children can watch television. The same system can be used to limit the child's on-line access time.

Figure 29:
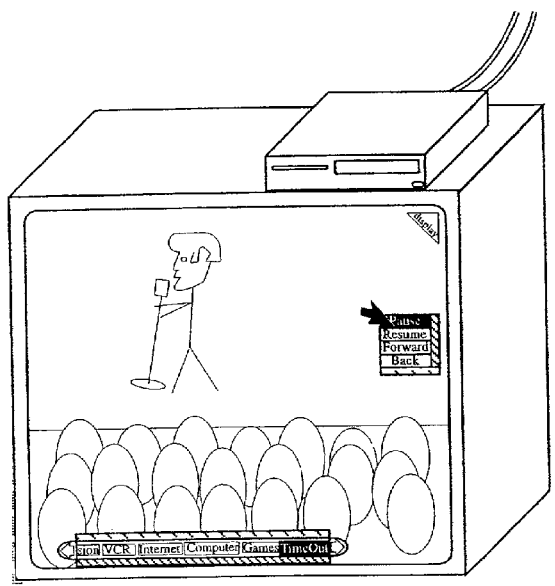
FIG. 29 shows a television display during a time shifting operation.

FIG. 29 shows the television display during a time shifting operation. During the viewing of a television program, the user can click on a remote control button, or click the display triangle location (top right corner) to bring up the control scroll bars. In this case, the viewer has chosen the "time out" icon, and pauses the viewing of the show in the time shifted manner described herein. A still image of the program that was being viewed may be displayed, or the user can go to other television channels or on-line data acquisition. Anytime the user wishes to return to the paused program, the appropriate instruction is inputted to the inventive system as discussed herein and viewing of the program resumes from the point of departure.

Figure 30:
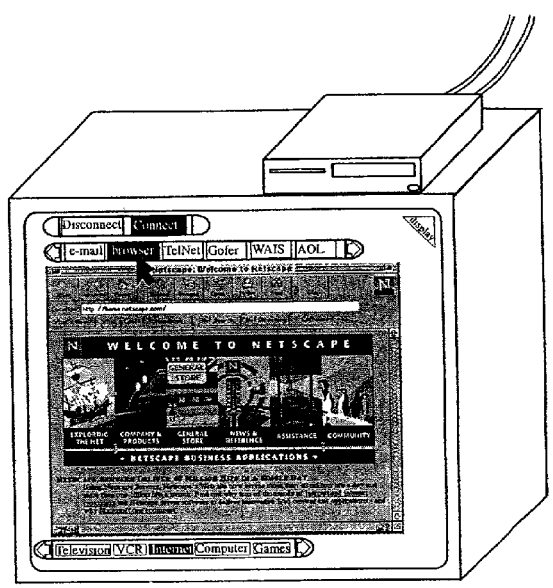
FIG. 30 shows an on-line browser displayed during the pause in the television viewing.

FIG. 30 shows an on-line browser displayed during the pause in the television viewing. The viewer can navigate through the world wide web or through content embedded in the television signal, thus gaining access to educational and entertainment options during the arbitrary viewing pause. These options are not available using a conventional television or computer system.

Figure 31:
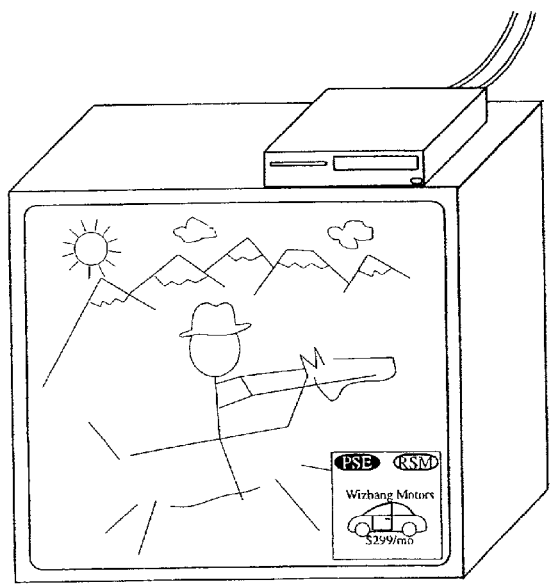
FIG. 31 shows a television commercial displayed along with a television program.

As shown in FIG. 31, a television commercial may be displayed along with the television program. If the viewer is interested in the item advertised, television viewing can be paused and content related to the advertised item can be accessed and perused at the viewers leisure. Television signal providers may give viewers the option of continually streamed commercials, that are specific to the viewer's demographics or previous viewing behavior. Or, the commercials can be interjected during breaks in the television program as is done with conventional television broadcasting.

Figure 32:
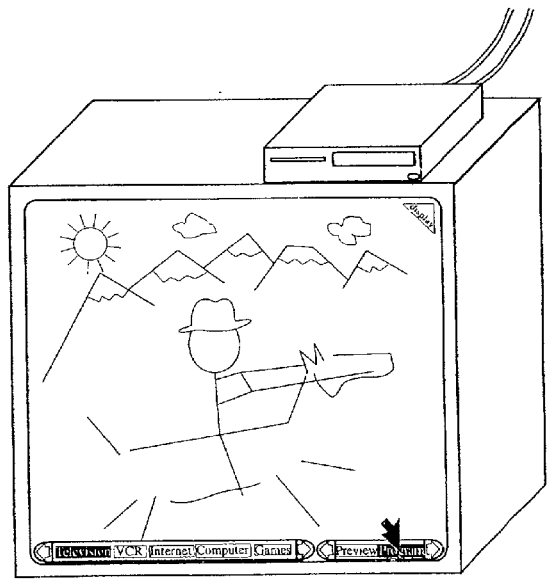
FIG. 32 illustrates the display toggled between a preview screen and a viewed television program.

FIG. 32 shows the display toggled between the preview screen (shown in FIG. 26) and the viewed television program. The television program can be paused when the viewer access the preview screen. During the pause, the viewer can select any of the other function icons, such as VCR, Internet, Computer and Games, and enjoy the options available from those functions while the television program is time shifted. At any time, the viewer can return to the television program from the point of departure (when the pause began).

FIG. 33 shows a television commercial displayed with a hyper-link to related content embedded in the television signal and/or an Internet Site. The address of the internet site can he added to an advertisers "hot" list and stored in memory so that it can be later accessed by the viewer. This advertisers hot list can be updated during each television program, or may be a cumulative list. Also, using artificial intelligence the viewer's preferences and viewing habits can be noted so that viewer specific advertisements that fit the viewer's own preferences and habits can be sent from the television signal provider. When the viewer goes to the content provided in the television signal or the Internet, the program is automatically paused and time shift as described herein begins.

FIG. 34 is a block diagram illustrating the components of a television system enabled with the inventive technology. A signal receiver receivers an incoming television and/or data signal. In this case the television signal includes channels at prescribed frequencies. Some of these channels carry the television programs and some carry the data. The signal receiver can be, for example, a cable television set top box or Internet/television appliance, such as WebTV. This signal is tuned by a television signal tuner and a data signal tuner. The television signal tunes in the television programs and acts as the television signal connection. The data signal tuner tunes in the data signal contained in the television program (or via another information transport vehicle, such as a telephone line, satellite or wireless system). This data signal is provided to, for example, a computer CPU where it can be stored, or otherwise manipulated. The television signal from the television signal tuner and the data from the computer CPU are received by controlling means (which may be the computer CPU). The controlling means controls the display of information on the displaying means depending on input from a user interface. The user interface includes a remote user inputting means, such as, but not limited to, a keyboard, a wireless keyboard, a voice activation mechanism, or remote control. A signal from the user inputting means is received by a remote signal receiving means, which is similar to the remote control signal receiver employed by, for example, a conventional VCR. The receiving means may be infrared, wire or RF based depending on the remote signal. The receiving means feeds its signal to the user input determining means where the remote signal is converted to instructions that can be used to manipulate the control of the recording means, displaying means, television signal tuner and data signal tuner by the controlling means depending on the user's desires. The controlling means also controls the recording means (as described herein) to record the television signal and the data signal depending on the user input.

FIG. 35 is a block diagram illustrating the components of another television system enabled with the inventive technology. In this case, the signal for at least one television channel includes a television program/data mix of multiple frequencies. The television program portion normally will be the bulk of the channel signal, with the data portion comprising information that can be incorporated into portions of the television signal such as the vertical blanking interval. The data signal can include information related to a particular television program and may be included in the vertical blanking interval of the television signal. Alternatively, the data signal can be a separate television frequency or channel. The data can be "front loaded" before a program begins. In this case, the data can be sent from the television signal provider during most or all the signal intervals that occur prior to the show, and just during the VBI. This data can be stored locally on the user's apparatus, and can be linked to the program via, for example, HTML code or the like. For example, when a television commercial having a hyperlink embedded in it is displayed, the user can click on or otherwise activate the hyperlink and the appropriate stored data retrieved for display (at the same time, the television program can be time-shifted in the manner described herein).

The incoming video and data signal mix is received by signal receiving means (such as a set top box, or television tuner/data signal tuner circuitry). The received signal is processed by a signal processor. The signal processor includes a television signal tuner and a data signal tuner. The television signal tuner tunes in a channel in the conventional manner. Data processing occurs using a data signal tuner for extracting the data information from the channel signal by determining when the VBI occurs, and capturing the data stream contained in the VBI This data is stored in data storing means, such as a computer hard drive, recordable CD or DVD, RAM, magnetic tape, etc. Data process means (CPU) is used to process this data depending on, for example, user inputted instructions.

Figure 36:
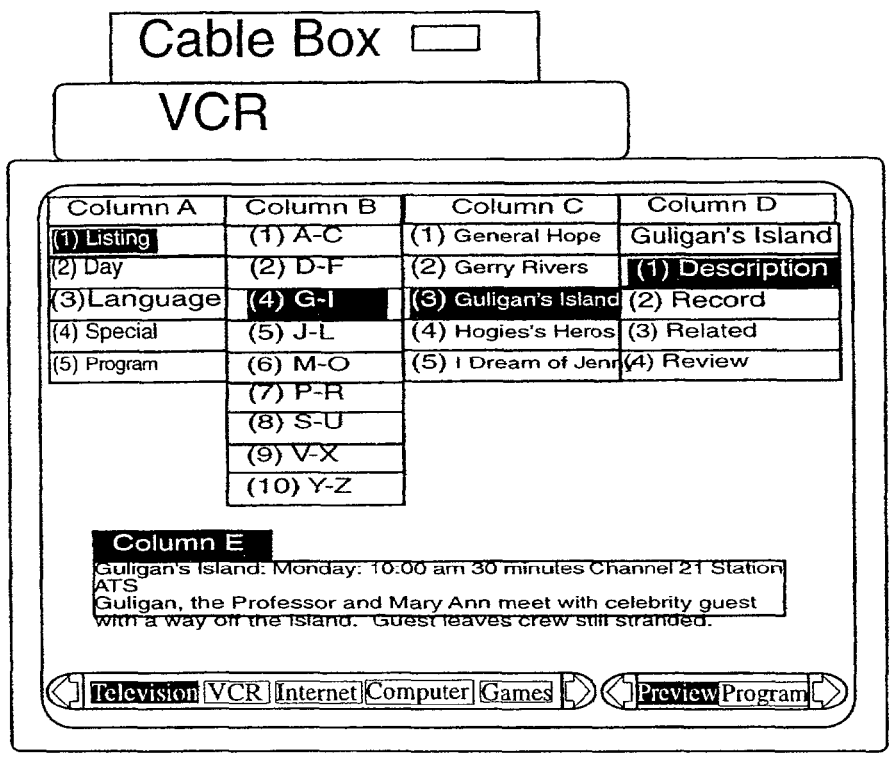
FIG. 36 shows a screen displaying television program scheduling information delivered via a television signal.

FIG. 36 schematically shows a screen displaying television program scheduling information as described above with reference to the Internet web site. The information signal containing the data regarding the programming schedule can be received via the television connection as a portion of the television/data signal mix. The data signal is filtered out or otherwise separated from the television signal and the data is stored on a hard drive, RAM or other storage medium. Alternatively, the information can be continuously sent from the television system provider. This information allows the user to search for programs depending on a number of search criteria such as program listing, day, language, special and program (Column A).

Figure 37:
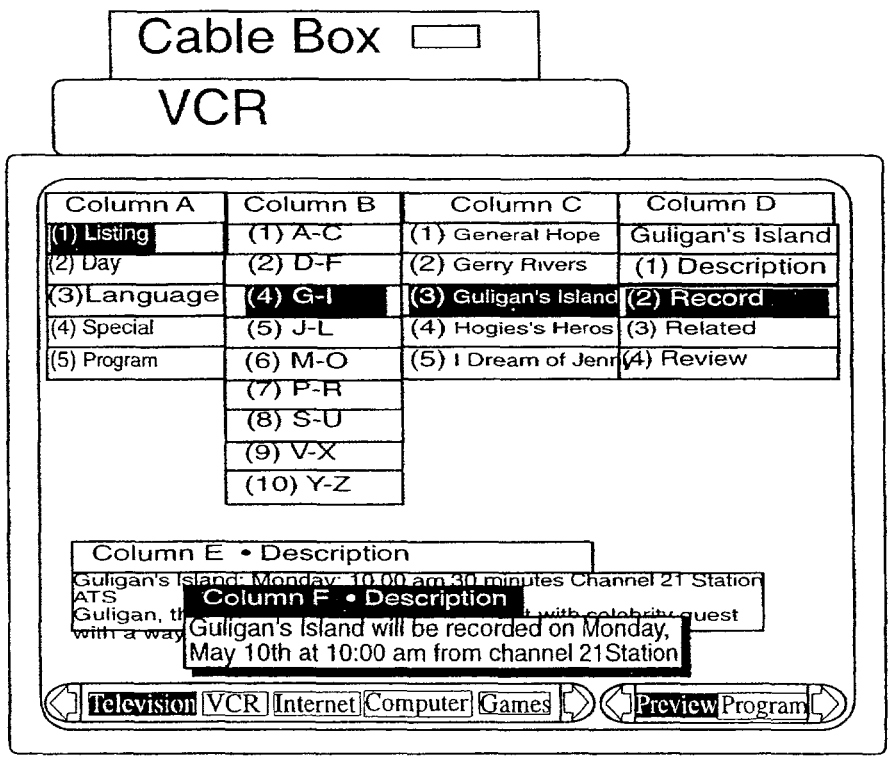
FIG. 37 shows a screen displaying television program scheduling information delivered via a television signal.
Figure 38:
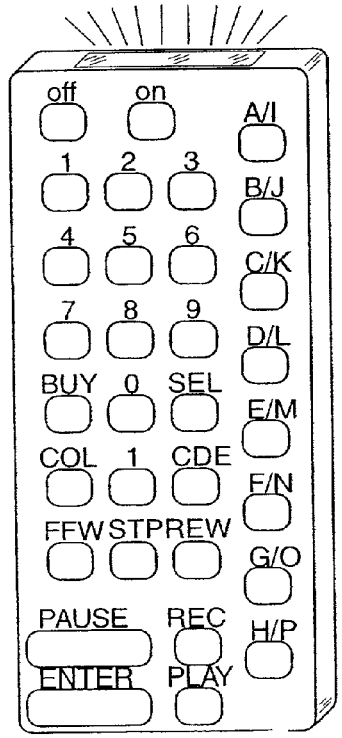
FIG. 38 shows a configuration of a remote control input device that can be used in accordance with the present invention(s)
Figure 39:
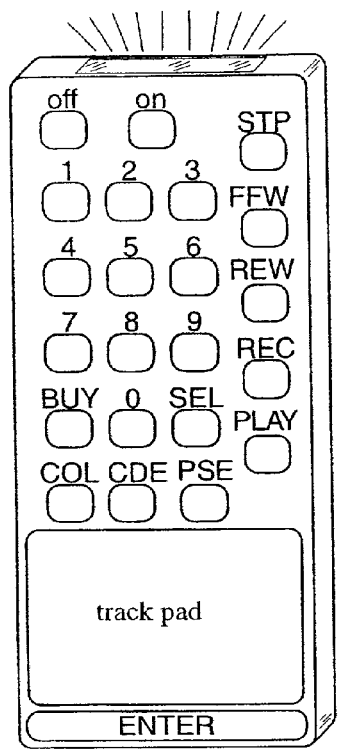
FIG. 39 shows another configuration of a track pad remote control input device that can be used in accordance with the present invention(s)
Figure 40:
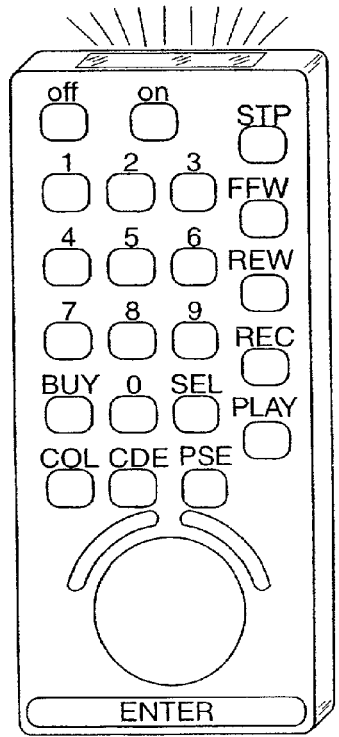
FIG. 40 shows another configuration of a track ball remote control input device that can be used in accordance with the present invention(s)

As shown in FIG. 37, the viewer can choose to have the VCR controlled via the inventive apparatus to facilitate program recording. The data is received from the television system provider rather than from the Internet, and the information is stored locally on the user's system or can be remotely stored on the television system provider's storage medium, in a manner similar to the storage of information specific to a particular user employed, for example, by WebTV.

Figure 41:
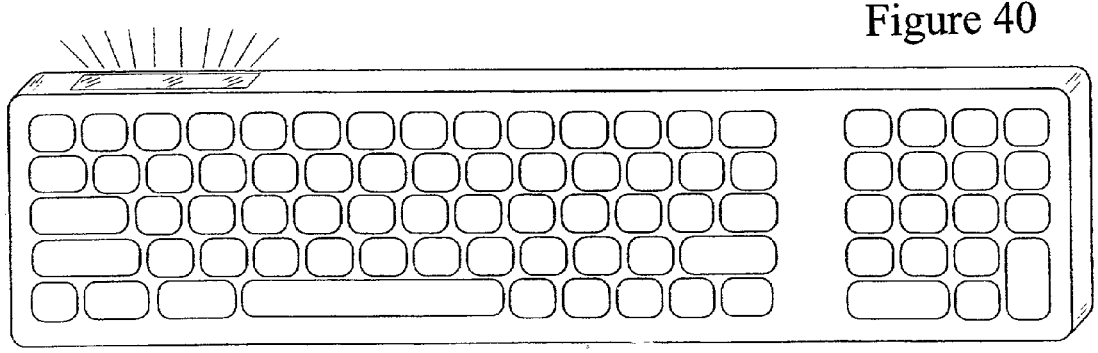
FIG. 41 shows another configuration of a wireless keyboard input device that can be used in accordance with the present invention(s)

FIGS. 38 through 41 show various nonlimiting configurations or a remote control input device that can be used in accordance with the present invention(s). The input device can be a remote controller that includes push buttons (FIG. 38); a track pad (FIG. 39); a track ball (FIG. 40 and/or a wireless keyboard (FIG. 41). The remote input device can be optical or radio based, or may be hard wired to the input receiving means.

FIG. 42 shows a portion of a programming grid that may be downloaded via an Internet website, information embedded in a television signal or information streamed in via a television channel devoted to data. Each of the programming blocks is assigned an alpha/numeric value so that an input device, such as that shown in FIG. 38 can be utilized in an efficient manner. In this case, the user does not have to move a pointer around the screen (as would be required using a mouse-type input device), thus reducing the complexity of the apparatus since there does not have to be a visual confirmation (i.e., pointer) displayed on the screen.

In accordance with the present invention, a time sequential signal is received via, for example, an antenna, a cable television hook up, Internet modem connection, satellite transmission or other information transfer mechanism. The information depending on the time sequential signal is displayed for viewing on a television, computer monitor, radio, or other displaying device. The information that is displayed may be a television or radio program, or received data from a computer network, such as the Internet. The present invention enables asynchronous viewing of a multicasted or broadcasted television program in conjunction with the perusal at the viewer's leisure of computer network information, such as a world wide web page downloaded from the Internet. The present invention allows a viewer to pause the display of a program and switch to another media system, such as an Internet connection. The viewer can access information from the Internet computer network while pausing the display of a television program.

The time sequential signal may be a television program which contains a blanking interval (a portion of the video signal that is received during a time when the video display scanning returns to the top of the screen). The blanking interval can include blanking interval information including a selectable link, such as a network address, to network information, such as a world wide web page, from a computer network, such as the Internet. The television program is displayed before receiving the pause display command. When the viewer wishes to obtain information via the Internet, the viewing of the television program is paused and the computer network is accessed using a modem or other suitable accessing means. The network information that is addressed by the selectable link is received from the computer network. This network information is displayed while the viewing of the television program is paused and time sequential signal is recorded so that the program viewing can be returned to at a later time without missing any of the program.

As described above with reference to FIG. 19, etc., program information can be retrieved from the Internet, the television signal, or other medium, and displayed for the user during the operation of the inventive multi-featured multi-media appliance. The program information can be searched to select specific shows that are of interest to the user. These shows can be recorded by utilizing the algorithm described with reference to FIG. 7, etc., to enable the inventive multi-featured multi-media appliance to provide easy VCR or video recording capabilities.

The foregoing is considered as illustrative only of the principles of the invention. Further, since numerous modifications and changes will readily occur to those skilled in the art, it is not desired to limit the invention to the exact construction and operation shown and described. Accordingly all suitable modifications and equivalents may be resorted to, falling within the scope of the invention.

What is claimed is:

1. In a network server that communicates over a network with a recording apparatus that is configured to record television programs, a method for enabling the server to control the recording of one or more selected television programs by the recording apparatus, the method comprising the acts of:

storing a programming schedule at a server;

storing recording control information at the server, the recording control information including at least one record command that is transmittable over a network to a recording apparatus that is configured to record television programming;

the server receiving a user request, which is transmitted to the server through the Internet, for a webpage containing the programming schedule and that identifies one or more television programs;

in response to the user request, the server providing a user Internet access to the programming schedule in the form of a navigable webpage and from which a particular television program can be selected by the user for recording;

receiving, at the server, a user selection of the particular television program to be recorded, the selection of the particular television program to be recorded being made from the navigable webpage provided to the user through the Internet; and in response to the particular television program being selected for recording, the server transmitting recording control information to the recording apparatus over the network, the recording control information comprising recording instructions that are configured to cause the recording apparatus to record the particular television program and such that the recording apparatus will thereafter be set up to record the particular television program, and wherein the recording instructions are transmitted to the recording apparatus from the server through at least one of a television signal and the Internet.

2. A method as recited in claim 1, further comprising the act of receiving information representing a television signal provider that is to broadcast the one or more television programs to be recorded by the interactive television system.

3. A method as recited in claim 2, further comprising, prior to the act of receiving information representing a television signal provider, the act of transmitting information identifying a plurality of television signal providers that are capable of broadcasting television programs to the interactive television system.

4. A method as recited in claim 1, wherein the server transmits the recording instructions through the Internet.

5. A method as recited in claim 1, wherein the programming schedule includes a time, date and duration of a plurality of television programs, including the particular television program to be recorded.

6. A method as recited in claim 1, wherein the programming schedule includes transmission source information that identifies at least one of a television broadcast channel, a cable channel, and a satellite channel.

7. A method as recited in claim 1, wherein the recording apparatus comprises a VCR.

8. A method as recited in claim 1, wherein the recording instructions include the time, date and duration of the particular television program to be recorded.

9. A method as recited in claim 1, wherein the request for a programming schedule is received at an Internet web site through the use of a conventional Web browser.

10. A method as recited in claim 1, wherein the programming schedule is provided through a web page of the server that is customized for the user.

11. A method as recited in claim 10, wherein prior to providing the programming schedule, user input is received at the web page identifying a television programming provider.

12. A method as recited in claim 1, wherein the recording instructions are embedded in and received with the television signal.

13. A method as recited in claim 12, wherein the recording instructions are inserted in special television channel.

14. A method as recited in claim 1, wherein the programming information is made available to the user based on a determination of at least one of a caller ID, area code and phone number of the user.

15. A method as recited in claim 14, wherein the locality of the user's modem is determined according to a phone number.

16. A method as recited in claim 12, wherein the recording instructions are received as a binary ASCII-format character string that is assigned specific control functions.

17. A method as recited in claim 1, wherein the programming schedule is based on determining a locality of a user's modem.

18. A method as recited in claim 17, wherein the locality of the user's modem is determined according to a caller ID.

19. A method as recited in claim 1, wherein subsequent to downloading recording instructions, the server transmits data comprising an end-of VCR control information to the computing system.

20. A method as recited in claim 1, further comprising:
receiving, at the server, a request from a computing system to access a programming homepage;
in response to the request to access the programming homepage, providing the computing system access to the programming homepage, the programming homepage identifying a plurality of television signal providers;
receiving, at the server, a selection of an appropriate one of the plurality of television signal providers; and
in response to the computing system selecting the appropriate television signal provider, and upon receiving a request from the computing system for a corresponding program schedule, the server providing the programming schedule.

21. A method as recited in claim 20, wherein access to the programming homepage is accessible only after screening a user password.

22. A method as recited in claim 1, wherein the recording instructions are received through the Internet.

23. A method as recited in claim 1, wherein the method further includes the server sending data comprising about to send VCR control information prior to actually transmitting the recording control information.

24. A method as recited in claim 1, wherein the recording control information comprises VCR control information.

25. In a recording system that is configured to record television programs and that is communicably connectable to a server through a network, a method for enabling the server to control the recording of one or more selected television programs by the recording system, the method comprising the acts of:
sending a request from the recording system to the server for a program schedule that identifies television programs that can be received and recorded by the recording system;
receiving, at the recording system, the program schedule from the server through the Internet and in response to the request, the program schedule being provided as a webpage;
displaying, at the recording system, the program schedule after it is received from the server;
receiving, at the recording system, a user selection from the program schedule of a particular television program to be recorded;
sending a request from the recording system to the server for the selected and particular television program to be recorded;
receiving, at the recording system, and directly in response to the request for the particular television program to be recorded, recording instructions that will cause the recording system to record the particular television program, wherein the recording instructions from the server are received by the recording system through at least one of a television signal and the Internet.

26. A method as recited in claim 25, further comprising the acts of
prior to sending the first request, receiving user input at the computing system selecting a television signal provider associated with a location of the interactive television system; and
transmitting information representing the selection of the television signal provider to the server.

27. A method as recited in claim 25, wherein the recording instructions include a record command for the recording system.

28. A method as recited in claim 27, wherein the recording system includes a VCR.

29. A method as recited in claim 25, wherein the recording instructions include at least one of the time, date, duration and tuning instructions corresponding to the particular television program to be recorded.

* * * * *

UNITED STATES PATENT AND TRADEMARK OFFICE
CERTIFICATE OF CORRECTION

PATENT NO.         : 8,046,800 B2
APPLICATION NO.    : 09/993780
DATED              : October 25, 2011
INVENTOR(S)        : John J. Daniels It is certified that error appears in the above-identified patent and that said Letters Patent is hereby corrected as shown below:

In Drawing, Sheet 1 of 22, Fig. 1, Reference Numeral 16, line 3, delete "Medium" and insert -- Means --, therefor.

In Drawing, Sheet 1 of 22, Fig. 1, Reference Numeral 22, line 3, delete "Medium" and insert -- Means --, therefor.

In Drawing, Sheet 5 of 22, Fig. 10, Step Four, line 1, delete "Receive" and insert -- Received --, therefor.

In Drawing, Sheet 5 of 22, Fig. 11, Step Three, line 1, delete "Schedualing" and insert -- Scheduling --, therefor.

In Drawing, Sheet 6 of 22, Fig. 12, Step Four, line 1, delete "deterime" and insert -- determine --, therefor.

In Drawing, Sheet 7 of 22, Fig. 15, Step Three, line 2, delete "conntection" and insert -- connection --, therefor.

In Drawing, Sheet 8 of 22, Fig. 17, Step One, line 3, after "info" delete ",".

In Drawing, Sheet 19 of 22, Fig. 33, line 1, delete "Incomming" and insert -- Incoming --, therefor.

In column 25, line 5, delete "lime," and insert -- time, --, therefor.

In column 25, line 30, delete "or" and insert -- of --, therefor.

In column 34, line 33, in Claim 26, after "of" insert -- : --.

Signed and Sealed this
Twenty-seventh Day of December, 2011

David J. Kappos
*Director of the United States Patent and Trademark Office*